United States Patent
Kondo et al.

(10) Patent No.: US 8,184,584 B2
(45) Date of Patent: May 22, 2012

(54) WIRELESS DEVICE WHICH SELECTS ROUTES EXCLUDING LOOP ROUTES AND A MESH NETWORK INCLUDING THE SAME

(75) Inventors: Yoshihisa Kondo, Kyoto (JP); Satoko Itaya, Kyoto (JP); Peter Davis, Kyoto (JP); Ryutaro Suzuki, Kyoto (JP); Sadao Obana, Kyoto (JP); Tetsuya Ito, Tokyo (JP); Akira Matsumoto, Tokyo (JP)

(73) Assignees: NEC Communications Systems, Ltd., Tokyo (JP); Advanced Telecommunications Research Institute International, Kyoto (JP)

( * ) Notice: Subject to any disclaimer, the term of this patent is extended or adjusted under 35 U.S.C. 154(b) by 881 days.

(21) Appl. No.: 12/256,753

(22) Filed: Oct. 23, 2008

(65) Prior Publication Data
US 2009/0109901 A1 Apr. 30, 2009

(30) Foreign Application Priority Data
Oct. 25, 2007 (JP) .................. 2007-277484

(51) Int. Cl.
*H04W 4/00* (2009.01)

(52) U.S. Cl. ......... 370/330; 370/338; 370/401; 455/445

(58) Field of Classification Search .................. None
See application file for complete search history.

(56) References Cited

U.S. PATENT DOCUMENTS

| 6,327,669 | B1 * | 12/2001 | Croslin | 714/4.1 |
|---|---|---|---|---|
| 7,715,395 | B2 * | 5/2010 | Ginchereau et al. | 370/392 |
| 2006/0153081 | A1 * | 7/2006 | Simonsson et al. | 370/238 |
| 2007/0147255 | A1 * | 6/2007 | Oyman | 370/238 |
| 2007/0248104 | A1 * | 10/2007 | Rudolf et al. | 370/400 |
| 2008/0019328 | A1 * | 1/2008 | Rudnick | 370/337 |
| 2008/0181133 | A1 * | 7/2008 | Thubert et al. | 370/255 |
| 2008/0198865 | A1 * | 8/2008 | Rudnick et al. | 370/406 |

FOREIGN PATENT DOCUMENTS

| JP | 2003-69620 A | 3/2003 |
|---|---|---|
| JP | 2003-188797 A | 7/2003 |
| JP | 2005-531173 A | 10/2005 |
| JP | 2006-25372 A | 1/2006 |
| JP | 2008-278432 A | 11/2008 |
| WO | 03/098816 A3 | 11/2003 |

OTHER PUBLICATIONS

Japanese Office Action Dated Aug. 25, 2009, issued in corresponding Japanese Patent Application No. 2007-277484.

(Continued)

*Primary Examiner* — Bob Phunkulh
(74) *Attorney, Agent, or Firm* — Westerman, Hattori, Daniels & Adrian, LLP

(57) ABSTRACT

In wireless communication using links with neighbor wireless devices, a wireless device calculates ratios of throughput to maximum throughput for the links and calculates the costs of the links using the calculated ratios. Then the wireless device finds, for each destination, a route in which the sum of such calculated link costs is the minimum, and sends a packet to the destination using the route. As a consequence, routing can be done according to an isotonic, easy-to-implement routing protocol.

10 Claims, 15 Drawing Sheets

OTHER PUBLICATIONS

A. Raniwala et al. "Architecture and Algorithms for an IEEE 802.11-Based Multi-Chennal Wirelezz Mesh Network," Proc. INFOCOM, 2005; pp. 2223-2234.

L. Loyola et al. "Multi-channel Wireless LAN Mesh Architecture with DCF-based Inter-AP Communication and Idle Channel Search Packet Forwarding," Proc. GLOBECOM 2005; vol. 6. pp. 3279-3284.

R. Draves et al. "Routing in Multi-Radio, Multi-Hop Wireless Mesh networks," Proc. ACM MOBICOM 2004, pp. 114-128.

Y. Yang "Designing Routing Metrics for Mesh networks," Proc. WiMesh 2005.

A.P. Subramanian et al. "Interference Aware Routing in Multi-Radio Wireless Mesh Networks,"Proc. WiMesh 2006.

* cited by examiner

| Destination | Next Wireless Device | Metric |
|---|---|---|
| — — — — | — — — — — — — | — — — — |
| — — — — | — — — — — — — | — — — — |
| ⋮ | ⋮ | ⋮ |

Fig. 5

NTBL

| Self Address | Link Channel between Self and Neighbor | Neighbor Address | Channel between Neighbor and 2-Hop Neighbor | 2-Hop Neighbor Address |
|---|---|---|---|---|
| ----- | ----- | ----- | ----- | ----- |
|  | ----- | ----- | ----- | ----- |
|  | ... | ... | ... | ... |

Fig. 8

NTBL1

| Self Address | Link Channel between Self and Neighbor | Neighbor Address | Channel between Neighbor and 2-Hop Neighbor | 2-Hop Neighbor Address |
|---|---|---|---|---|
| IPadd2 | Ch1 | IPadd1 | ------ | ------ |
| | Ch2 | IPadd3 | ------ | ------ |
| | Ch2 | IPadd4 | ------ | ------ |
| | Ch2 | IPadd5 | ------ | ------ |
| | Ch1 | IPadd6 | Ch3 | IPadd7 |
| | | | Ch1 | IPadd8 |

| Destination | Next Wireless Device | Metric |
|---|---|---|
| IPadd2 | IPadd2 | 1.09 |
| IPadd3 | IPadd2 | 2.18 |
| IPadd4 | IPadd2 | 2.39 |
| IPadd5 | IPadd2 | 2.39 |
| IPadd6 | IPadd2 | 2.31 |
| IPadd7 | IPadd2 | 3.50 |
| IPadd8 | IPadd2 | 3.50 |

| Destination | Next Wireless Device | Metric |
|---|---|---|
| IPadd1 | IPadd1 | 1.09 |
| IPadd3 | IPadd3 | 1.09 |
| IPadd4 | IPadd4 | 1.30 |
| IPadd5 | IPadd5 | 1.30 |
| IPadd6 | IPadd6 | 1.22 |
| IPadd7 | IPadd6 | 2.41 |
| IPadd8 | IPadd6 | 2.41 |

| Destination | Next Wireless Device | Metric |
|---|---|---|
| IPadd2 | IPadd2 | 1.20 |
| IPadd3 | IPadd2 | 2.40 |
| IPadd4 | IPadd4 | 1.20 |
| IPadd5 | IPadd2, IPadd4 | 2.34 |
| IPadd6 | IPadd2, IPadd4 | 3.48 |
| IPadd7 | IPadd4 | 2.40 |
| IPadd8 | IPadd2, IPadd4 | 3.48 |
| IPadd9 | IPadd2, IPadd4 | 4.68 |

| Destination | Next Wireless Device | Metric |
|---|---|---|
| IPadd1 | IPadd1 | 1.20 |
| IPadd3 | IPadd3 | 1.20 |
| IPadd4 | IPadd5 | 2.28 |
| IPadd5 | IPadd5 | 1.14 |
| IPadd6 | IPadd5 | 2.28 |
| IPadd7 | IPadd5 | 3.48 |
| IPadd8 | IPadd5 | 2.28 |
| IPadd9 | IPadd5 | 3.48 |

WIRELESS DEVICE WHICH SELECTS ROUTES EXCLUDING LOOP ROUTES AND A MESH NETWORK INCLUDING THE SAME

BACKGROUND OF THE INVENTION

1. Field of the Invention

The present invention relates to a wireless device and a mesh network including the same and more particularly to a wireless device which constitutes an autonomous wireless network and a mesh network including the same.

2. Description of the Related Art

Today, a terminal for ad-hoc networking which incorporates a plurality of interfaces and operates in a multi-channel mode is available and it is possible to construct a multi-channel ad-hoc network.

It has been reported that a multi-channel ad-hoc network provides a better network throughput than a single-channel one (Non-patent Document 1: A. Raniwala, and T. Chiueh, "Architecture and algorithms for an IEEE 802.11-based multi-channel wireless mesh network," Proc. INFOCOM, 2005. Non-patent Document 2: L. Loyola, T. Kumagai, K. Nagata, S. Otsuki and S. Aikawa, "Multi-channel wireless LAN mesh architecture with DCF-based inter AP communication and idle channel search packet forwarding," Proc. GLOBECOM'05, Vol. 6, pp. 3279-3284, 2005).

In such multi-channel ad-hoc networks, for higher network performance it is important to properly evaluate multi-channel links according to the condition of each channel and the degree of inter-link interference and reflect the result of evaluation in the transmission of data.

In a multi-channel environment, the degree of interference varies depending on the condition of each channel. Although interference caused by electronic apparatus like microwave ovens or Bluetooth wireless devices is difficult to avoid by a routing algorithm, the influence of interference which depends on the network topology, such as inter-link interference in a network, can be reduced by a routing metric which includes the influence of interference.

Methods which use such metrics to avoid the influence of interference have been proposed (Non-patent Document 3: R. Draves, J. Padhye, and B. Zill, "Routing in multi-radio, multi-hop wireless mesh networks", in Proc. ACM MOBICOM, pp. 114-128, 2004. Non-patent Document 4: Y. Yang, J. Wang, and R. Kravets, "Designing routing metrics for mesh networks," Proc. WiMesh'05, 2005. Non-patent Document 5: A. P. Subramanian, M. M. Buddhikot, and S. Miller, "Interference aware routing in multi-radio wireless mesh networks," Proc. WiMesh'06, 2006).

The method disclosed in Non-patent Document 3 uses a metric which takes the link throughput into consideration. The prior metric ETX (Expected Transmission Count) has been determined only according to packet loss ratio p as expressed by the equation below:

[Equation 1]

$$ETX = \frac{1}{1-p} \quad (1)$$

ETX, as calculated by Equation (1), does not consider the link throughput and has a tendency to evaluate even a low-throughput link highly if the packet loss ratio is low. For this reason, ETT (Expected Transmission Time) which considers the magnitude of the throughput is calculated by the equation below:

[Equation 2]

$$ETT = \frac{S}{B} \times ETX \quad (2)$$

In Equation (2), S denotes packet size and B denotes data rate.

ETT determined by Equation (2) is substituted into the following equation to determine WCETT (Weighted Cumulative ETT).

[Equation 3]

$$WCETT = (1-\beta)\sum_{i=1}^{n} ETT_i + \beta \times \max_{1 \leq j \leq k} X_j \quad (3)$$

In Equation (3), $\beta$ is a variable parameter which satisfies $0 \leq \beta \leq 1$, X denotes the total ETT for a channel, and i denotes hop number.

Since this method considers intra-flow interference but does not consider inter-flow interference, a high throughput cannot be achieved in an environment where there is much inter-flow interference. Besides, metric WCETT does not satisfy isotonicity. Therefore, this method does not guarantee loop-free routing and optimum routing in a proactive hop-by-hop routing protocol.

"Isotonicity" here means that route selection excludes loop routes. A "hop-by-hop routing protocol" means a routing protocol in which a wireless device acting as a repeater makes reference only to the destination of a packet when it selects a route to forward the packet to the destination.

The method described in Non-patent Document 4 considers inter-flow interference and satisfies isotonicity. Specifically this method calculates the metric MIC in accordance with the following equation:

[Equation 4]

$$\begin{aligned} MIC(p) &= \frac{1}{N \times \min(ETT)} \sum_{link l \in p} IRU_l + \sum_{node i \in p} CRC_i \\ IRU_l &= ETT_l \times N_l \\ CRC_i &= \begin{cases} w_1 \text{ if } CH(prev(i)) \neq CH(i) \\ w_2 \text{ if } CH(prev(i)) = CH(i) \\ 0 \leq w_1 \leq w_2 \end{cases} \end{aligned} \quad (4)$$

In Equation (4), N is the total number of terminals in the network and min (ETT) is the minimum ETT in the network which is estimated based on the lowest transmission rate for a wireless card. $N_l$ denotes the number of wireless devices in the set of neighbor wireless devices which interfere with each other on link l and CH (i) denotes a channel assigned to terminal i. prev (i) denotes the number of preceding hops along path p for terminal i.

Although the metric MIC does not satisfy isotonicity due to the second term (CRC), isotonicity can be satisfied by the use of a virtual terminal. The method described in Non-patent Document 5 estimates the influence of interference in detail using the above WCETT metric.

BRIEF SUMMARY OF THE INVENTION

Since the method described in Non-patent Document 3 does not satisfy isotonicity, it has the problem that it does not guarantee loop-free routing and optimum routing in a proactive hop-by-hop routing protocol.

In the method described in Non-patent Document 4, the computational effort required for the Dijkstra's algorithm used to find the shortest path increases exponentially according to the number of terminals, and for larger networks much more computational effort is required. Thus the method is difficult to implement for a large network.

Furthermore, the method described in Non-patent Document 5 has a problem that it does not satisfy isotonicity because it uses WCETT.

Therefore, the present invention has been made in order to solve the above problems and an object thereof is to provide a wireless device which selects routes according to a routing protocol which satisfies isotonicity and is easy to implement.

Another object of the invention is to provide a mesh network including a wireless device which selects routes according to a routing protocol which is isotonic and easy to implement.

According to one aspect of the invention, there is provided a wireless device which is used in a mesh network including a plurality of wireless devices located in a mesh pattern, and makes wireless communication using a plurality of channels, comprising a routing table, a plurality of interfaces, a tabulation unit and a communication unit. The routing table stores route information. Each of the interfaces transmits and receives a packet using one channel selected from among the channels. The tabulation unit creates a routing table by detecting a route with relatively large ratio of throughput to maximum throughput, excluding loop routes and considering channel interference in flows, and storing the detected route as the optimum route to a destination. The communication unit selects the optimum route from the routing table and transmits a packet.

Preferably the tabulation unit stores, in the routing table, a route metric which is smaller when the ratio of throughput to maximum throughput is larger, and larger when the ratio of throughput to maximum throughput is smaller, and a destination corresponding to the route metric to indicate the optimum route.

Preferably the tabulation unit calculates, based on channel distributions in all flows passing through a link to be evaluated, ratios of throughput to maximum throughput for wireless communication using the link to be evaluated, and calculates the route metrics from the calculated ratios of throughput to maximum throughput and stores the calculated metrics in the routing table in correspondence with the destinations.

Preferably the tabulation unit detects, based on the channel distributions, all channel distribution patterns in the flows, and categorizes all the detected channel distribution patterns into a plurality of standard distribution patterns and counts the number of channel distribution patterns categorized to each standard distribution pattern, and calculates ratios of throughput to maximum throughput for wireless communication using the link to be evaluated, from the counted numbers, the number of all the distribution patterns and actually measured ratios of throughput to maximum throughput for each standard distribution pattern.

Preferably the tabulation unit calculates ratios of throughput to maximum throughput for wireless communication using the link to be evaluated, from the number of distribution patterns categorized to each standard distribution pattern, the number of all the distribution patterns, and actually measured ratios of throughput to maximum throughput for each standard distribution pattern, by weighted-averaging of actually measured ratios of throughput to maximum throughput for each standard distribution pattern, with weights that are ratios of probability that channel distribution patterns are categorized to each standard distribution pattern.

Preferably the tabulation unit calculates the route metrics which are in inverse proportion to the ratios of throughput to maximum throughput for wireless communication using the link to be evaluated.

Preferably the tabulation unit calculates link costs of all links between the wireless device concerned and wireless devices adjacent to it from the calculated ratios of throughput to maximum throughput. When the tabulation unit calculates the link costs of all the links, the communication unit broadcasts the calculated link costs.

Preferably the tabulation unit receives link costs broadcast from another wireless device and calculates route metrics from the received link costs.

Preferably the tabulation unit calculates route metrics from ratios of throughput to maximum throughput for wireless communication using the link to be evaluated, by a method which varies according to the type of application used for wireless communication.

Preferably, if the transmission rate in the wireless communication is relatively high, the tabulation unit calculates route metrics which are in inverse proportion to the ratios of throughput to maximum throughput, for wireless communication using the link to be evaluated.

According to another aspect of the invention, a mesh network includes a plurality of wireless devices located in a mesh pattern. Each of the wireless devices includes a routing table, a plurality of interfaces, a tabulation unit, and a communication unit. The routing table stores route information. Each of the interfaces transmits and receives a packet using one channel selected from among a plurality of channels. The tabulation unit creates the routing table by detecting a route with relatively large ratio of throughput to maximum throughput, excluding loop routes and considering channel interference in flows, and storing the detected route as the optimum route to a destination. The communication unit selects the optimum route from the routing table and transmits a packet.

According to the present invention, a wireless device creates a routing table by detecting a route with relatively large ratio of throughput to maximum throughput, excluding loop routes and considering channel interference in flows, and storing the detected route as the optimum route to a destination, and selects a route to the destination from the routing table. In other words, the wireless device selects a route with a relatively large ratio of throughput to maximum throughput with consideration to intra-flow channel interference.

Therefore, according to the present invention, since a route is selected based on ratios of throughput to maximum throughput in a flow with consideration to intra-flow channel interference, routing is done with less computational effort according to a routing protocol which is isotonic and easy to implement.

BRIEF DESCRIPTION OF THE DRAWINGS

FIG. 4 shows the structure of the routing table shown in FIG. 2;

FIG. 5 schematically shows the structure of a neighbor list;

FIG. 8 shows an example of the neighbor list;

FIG. 12 shows an example of the routing table;

FIG. 13 shows another example of the routing table;

FIG. 15 shows a further example of the routing table;

FIG. 16 shows another further example of the routing table; and

DETAILED DESCRIPTION OF THE PREFERRED EMBODIMENTS

Figure 1:
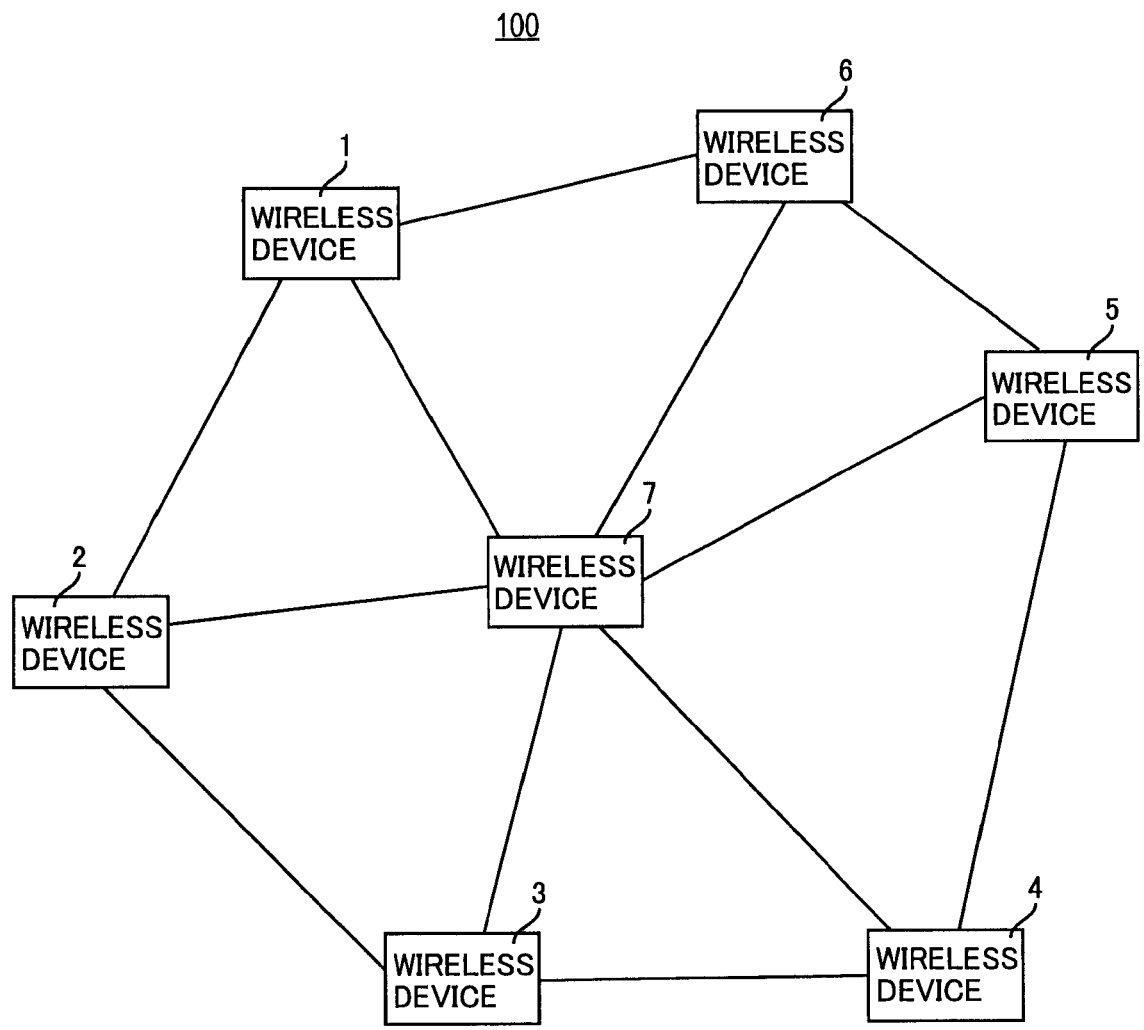
FIG. 1 is a schematic diagram of a mesh network according to a preferred embodiment of the present invention.

Next, the preferred embodiments of the present invention will be described in detail referring to the accompanying drawings. In the drawings, the same or like elements are designated by the same or like reference numerals and repeated description thereof is omitted.

FIG. 1 is a schematic diagram of a mesh network according to a preferred embodiment of the present invention. The mesh network 100 includes wireless devices 1-7. The wireless devices 1-7 are located in a mesh pattern in a wireless communication space, autonomously constructing a mesh network.

Each of the wireless devices 1-7 has, for example, two interfaces IF1 and IF2 and makes wireless communication using the two interfaces IF1 and IF2. In this case, when the mesh network 100 is constructed, different channels are assigned to the interfaces IF1 and IF2 of each of the wireless devices 1-7.

More specifically, two channels Chi and Chj are assigned to the interfaces IF1 and IF2 of each wireless device (1-7) where Chi and Chj are randomly selected from n channels Ch1 to Chn (i and j are two positive integers which satisfy i≠j and n is an integer which is 2 or larger). Two channels assigned to one wireless device (1-7) may be the same as, or different from, those assigned to another wireless device.

In the mesh network 100, each wireless device (1-7) can directly communicate with wireless devices located horizontally or obliquely adjacent to it as seen in FIG. 1.

In other words, wireless device 1 can make wireless communication with wireless device 4 using its interface IF1 (channel Chi) and also make wireless communication with wireless device 2 using its interface IF2 (channel Chj).

Using its interface IF1 (channel Chi), wireless device 1 can make wireless communication with wireless device 4 through wireless devices 2 and 3, or through wireless device 7, or through wireless devices 6 and 5.

Also, using its interface IF2 (channel Chj), wireless device 1 can make wireless communication with wireless device 3 through wireless device 2, or through wireless device 7, or through wireless devices 6, 5 and 4.

As described above, in the mesh network 100, each wireless device (1-7) makes multi-hop wireless communication with a destination using two interfaces IF1 and IF2. Therefore, in the mesh network 100, an ad-hoc network in a multi-channel environment is constructed.

However, in order to improve the throughput of the mesh network 100, the throughput of wireless communication (flow) which is made by each wireless device (1-7) using two channels must be improved.

Next, an explanation will be given of a communication method which performs routing so as to improve the throughput of wireless communication (flow) made by each wireless device (1-7) using two channels.

This embodiment employs an OLSR (Optimized Link State Routing) protocol as a protocol for establishing a wireless communication route between the source and destination. This OLSR protocol is a proactive, hop-by-hop routing protocol where Hello and TC (Topology Control) messages are used to exchange route information to create a routing table.

Figure 2:
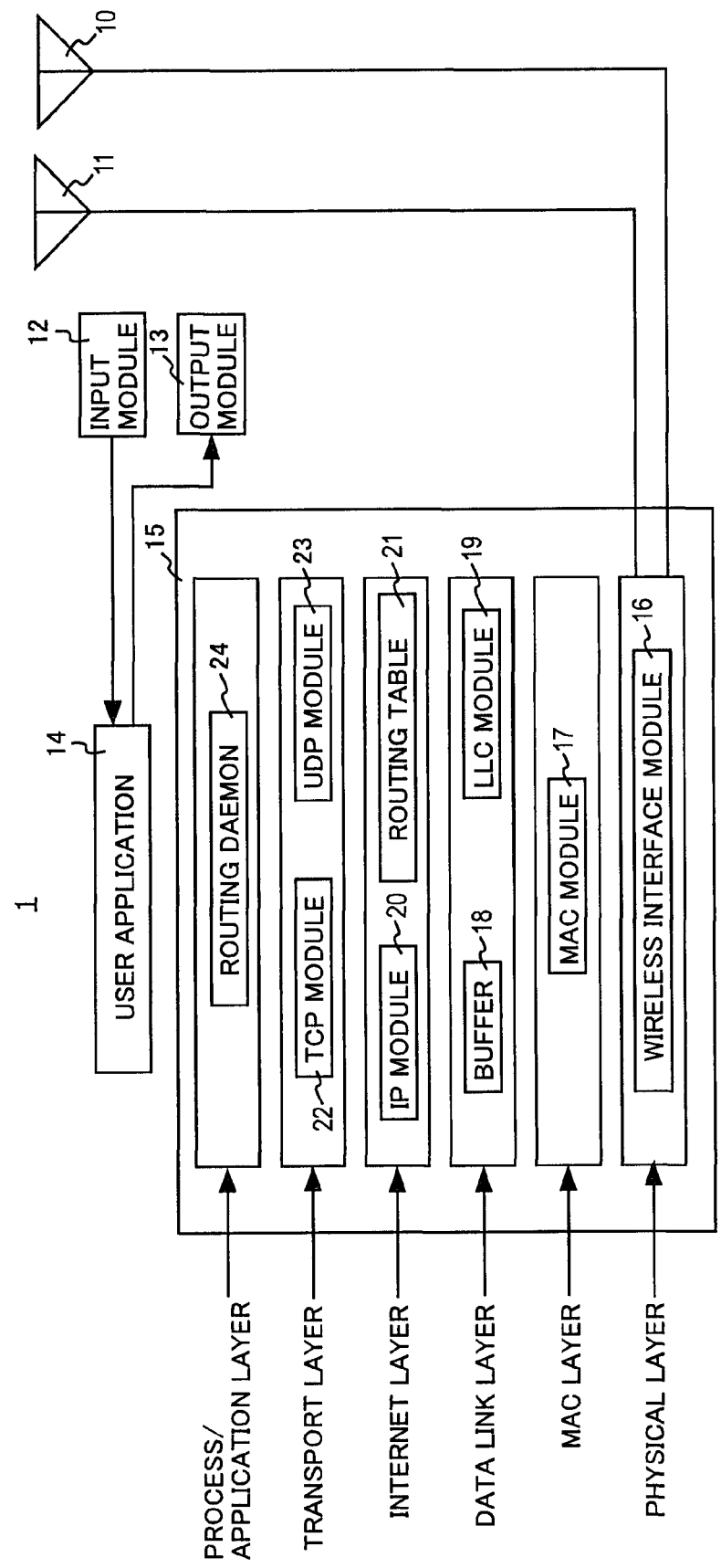
FIG. 2 is a schematic block diagram showing the configuration of the wireless device shown in FIG. 1.

FIG. 2 is a schematic block diagram showing the configuration of wireless device 1 shown in FIG. 1. Wireless device 1 includes antennas 10, 11, an input module 12, an output module 13, a user application 14, and a communication control module 15.

Each antenna (10, 11) receives data from another wireless device via a wireless communication space and transfers the received data to the communication control module 15 and also transmits data from the communication control module 15 to another wireless device via the wireless communication space.

The input module 12 receives a message and a destination address which have been entered by the operator of wireless device 1 and transfers the received message and destination address to the user application 14. The output module 13 displays the message under the control of the user application 14.

The user application 14 generates data based on the message and destination address from the input module 12 and transfers it to the communication control module 15.

The communication control module 15 includes a plurality of modules which control communications in accordance with the ARPA (Advanced Research Projects Agency) Internet layer structure. Specifically, the communication control module 15 is comprised of a wireless interface module 16, a MAC (Media Access Control) module 17, a buffer 18, an LLC (Logical Link Control) module 19, an IP (Internet Protocol) module 20, a routing table 21, a TCP module 22, a UDP module 23, and a routing daemon 24.

The wireless interface module 16, belonging to the physical layer, has two interface modules IF1 and IF2. The wireless interface module 16 modulates/demodulates transmitted signals or received signals in accordance with a given rule and transmits/receives signals using at least one of the two interfaces IF1 and IF2.

The MAC module 17, belonging to the MAC layer, executes the MAC protocol to perform various functions as described below.

The MAC module 17 broadcasts the Hello packet received from the routing daemon 24 through the wireless interface module 16. Also the MAC module controls retransmission of data (packets).

The buffer 18, belonging to the data link layer, stores the packet temporarily. The LLC module 19, belonging to the data link layer, executes the LLC protocol to connect or disconnect the link with a neighbor wireless device.

The IP module 20, belonging to the Internet layer, generates an IP packet. An IP packet consists of an IP header and an IP data field to store a packet of a higher level protocol. Upon receiving data from the TCP module 22, the IP module 20 stores the received data in the IP data field and generates an IP packet.

Then the IP module 20 searches the routing table 21 in accordance with the OLSR protocol, a proactive routing protocol, and determines the route for transmission of the generated IP packet. Then the IP module 20 transmits the IP packet to the destination along the determined route.

The routing table 21, belonging to the Internet layer, stores route information in correlation with destinations in a manner which will be explained later.

The TCP module 22, belonging to the transport layer, generates a TCP packet. A TCP packet consists of a TCP header and a TCP data field to store data of a higher level protocol. The TCP module 22 sends the generated TCP packet to the IP module 20.

The UDP module 23, belonging to the transport layer, broadcasts the Update packet generated by the routing daemon 24 and receives an Update packet broadcast from another wireless device and transfers it to the routing daemon 24.

The routing daemon 24, belonging to the process/application layer, monitors the operation of other communication control modules and deals with requests from other communication control modules.

Furthermore, the routing daemon 24 calculates the optimum route from the route information in the Hello packet received from another wireless device and dynamically creates a routing table 21 in the Internet layer.

Wireless devices 2-7 shown in FIG. 1 each have the same configuration as wireless device 1 shown in FIG. 2.

Figure 3:
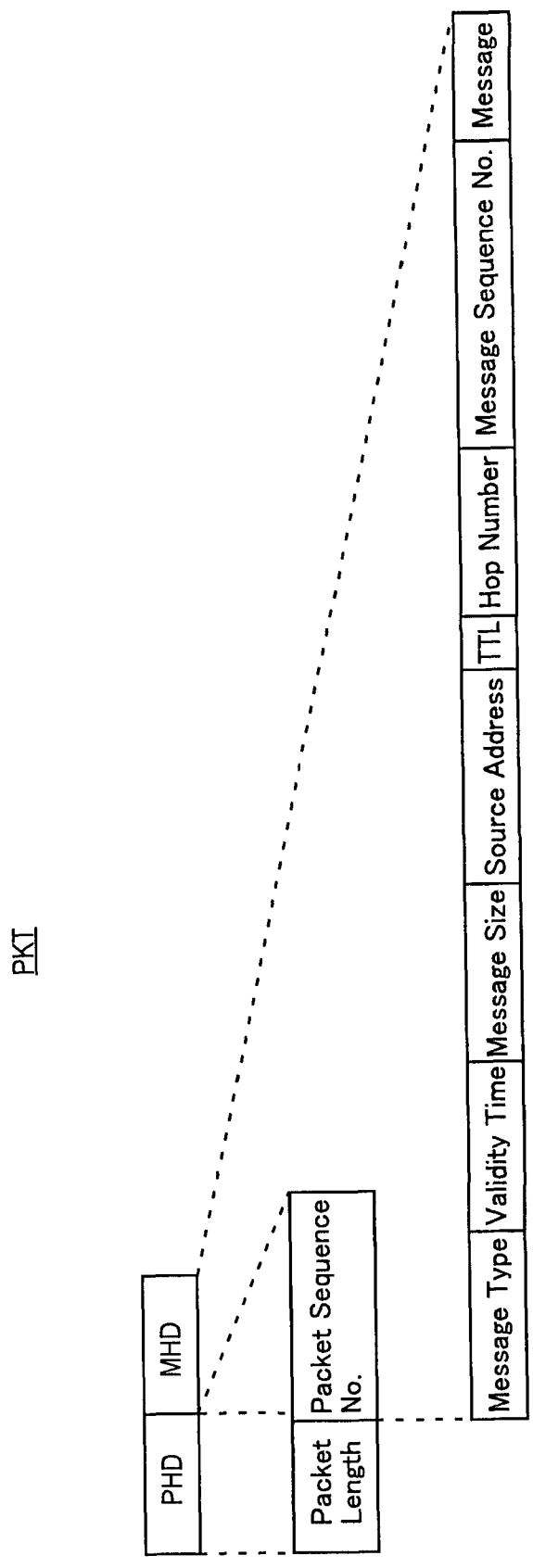
FIG. 3 shows the structure of a packet in an OLSR protocol.

FIG. 3 shows the structure of a packet PKT in the OLSR protocol. A packet PKT consists of packet header PHD and message header MHD. A packet PKT is received or transmitted using port No. 698 of the UDP module 23.

The packet header PHD consists of Packet Length and Packet Sequence Number. The Packet Length consists of 16 bit data and represents the number of bytes in the packet. The Packet Sequence Number consists of 16 bit data and is used to discriminate which packet is new. The Packet Sequence Number is incremented by one each time a new packet is generated. Therefore, the larger the Packet Sequence Number is, the newer the packet PKT is.

The message header MHD consists of Message Type, Validity Time, Message Size, Source Address, TTL, Hop Number, Message Sequence Number, and a message.

The Message Type consists of 8 bit data and represents the type of the message written in the message field where 0-127 are reserved. The Validity Time consists of 8 bit data and represents the time duration in which the message must be maintained after its receipt. The Validity Time consists of a significand and an exponent.

The Message Size consists of 16 bit data and represents the length of the message. The Source Address consists of 32 bit data and represents the wireless device which has generated the message. TTL consists of 8 bit data and represents the maximum number of hops traveled to relay the message. TTL is decremented by one each time the message is forwarded. When TTL is "0", the message is not forwarded. The Hop Number consists of 8 bit data and represents the number of hops traveled from the source which has generated the message. The Hop Number is first set to "0" and incremented by one each time it is forwarded. The Message Sequence Number consists of 16 bit data and represents an identification number assigned to each message. The Message Sequence Number is incremented by one each time a message is generated. The message is the message to be transmitted.

In the OLSR protocol, various messages are transmitted and received using packets PKT whose structure is as shown in FIG. 3.

FIG. 4 shows the structure of the routing table 21 shown in FIG. 2. The routing table 21 consists of corresponding entries for Destination, Next Wireless Device, and Metric. Destination, Next Wireless Device and Metric. "Destination" represents the IP address of a wireless device as a destination. "Next Wireless Device" represents the IP address of the wireless device to which the packet PKT should be next sent so as to transmit it to the destination.

For each wireless device (1-7) to transmit or relay a packet to a destination, "Metric" represents the minimum cost sum among the sums of costs of links existent between the wireless device and the destination. The metric here will be described later.

FIG. 5 schematically shows the structure of neighbor list NTBL. The neighbor list NTBL includes Self Address, Link Channel between Self and Neighbor, Neighbor Address, Channel between Neighbor and 2-hop Neighbor (wireless device two hops from its self), and 2-hop Neighbor Address.

Self Address, Link Channel between Self and Neighbor, Neighbor Address, Channel between Neighbor and 2-hop Neighbor, and 2-hop Neighbor Address correspond to each other.

"Self Address" is the IP address of the wireless device (self) which generates the neighbor list NTBL. "Link Channel between Self and Neighbor" is a channel for a link used in wireless communication between its self and a wireless device which is its neighbor.

"Neighbor Address" is the IP address of a wireless device which is a neighbor of the wireless device that generates the neighbor list NTBL.

"Channel between Neighbor and 2-hop Neighbor" is the channel used for wireless communication in a link between the neighbor wireless device and a wireless device two hops from its self.

"2-hop Neighbor Address" is the IP address of a wireless device located 2 hops from its self.

Figure 6:
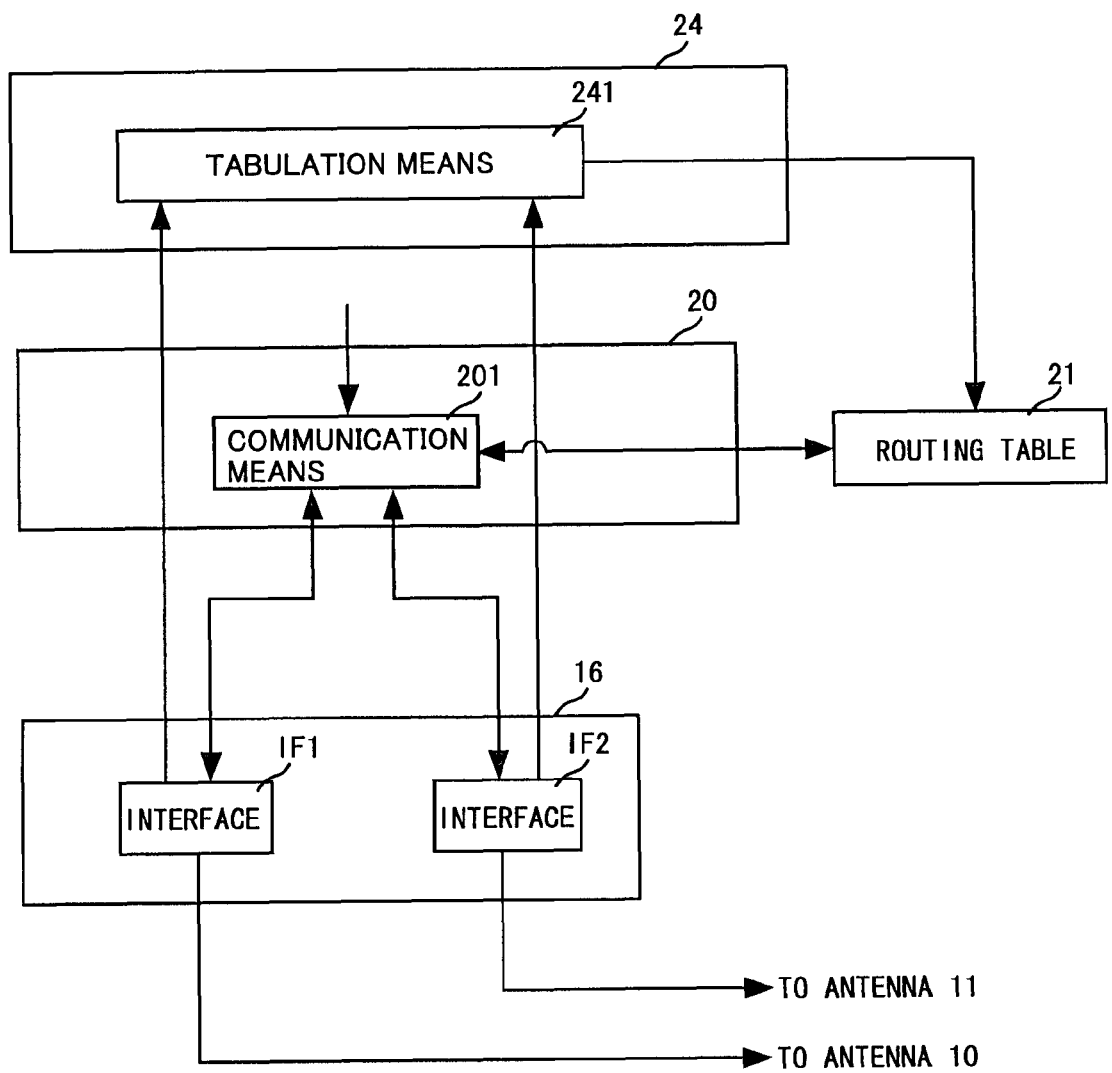
FIG. 6 is a functional block diagram showing the functions of the wireless interface module, IP module, and routing daemon in FIG. 2 which are related to the present invention.

FIG. 6 is a functional block diagram showing the functions of the wireless interface module 16, IP module 20, and routing daemon 24 in FIG. 2 which are related to the present invention.

The wireless interface module 16 includes interfaces IF1 and IF2. The IP module 20 includes a communication means 201. The routing daemon 24 includes a tabulation means 241.

Channels Chi and Chj are assigned to the interfaces IF1 and IF2, respectively. The interfaces IF1 and IF2 are connected with antennas 10 and 11, respectively.

The interface IF1 receives a packet from the communication means 201 and sends the received packet to another wireless device through the antenna 10 using the channel Chi, and transfers a packet received from another wireless device through the antenna 10 to the communication means 201 or the communication means 201 and tabulation means 241.

The interface IF2 receives a packet from the communication means 201 and sends the received packet to another wireless device through the antenna 11 using the channel Chj, and transfers a packet received from another wireless device through the antenna 11 to the communication means 201 or the communication means 201 and tabulation means 241.

The communication means 201 receives a TCP packet from the TCP module 22 and stores the TCP packet in the data field to create an IP packet. The communication means 201 makes reference to the routing table 21 and determines the transmission route for the IP packet and sends the packet along the determined transmission route using either the interface IF1 or IF2.

The communication means 201 also sends the packet received from the interface IF 1 or IF2 to a higher-level layer.

The tabulation means 241 dynamically creates a routing table 21 in the internet layer based on a Hello message and a TC message received from the interface IF1 or IF2 by a method which will be described later.

In the present invention, each wireless device (1-7) creates a routing table 21 according to the OLSR protocol. The process of creating a routing table 21 according to the OLSR protocol is explained below. For creation of a routing table 21, each wireless device (1-7) receives and sends a Hello message and a TC message.

A Hello message is periodically transmitted in order to distribute information which each wireless device (1-7) holds. In the present invention, each wireless device (1-7) transmits a Hello message including channel information which indicates the channels assigned to it. By receiving such Hello messages, each wireless device (1-7) collects information on surrounding wireless devices and recognizes wireless devices which exist around it.

In the OLSR protocol, each wireless device (1-7) maintains local link information. The Hello message is a message which is used to create local link information and transmit it. The local link information includes "Link Set," "Neighbor Wireless Device Set," "2-hop Neighbor Set and Set of Links to the Devices," "MPR Set," and "MPR Selector Set."

Link Set represents links to a set of wireless devices (neighbor wireless devices) which are directly reached by radio waves, where each link is represented by the validity time for a pair of addresses of two wireless devices. The validity time is also used to show whether the link is unidirectional or bidirectional.

Neighbor Wireless Device Set includes each neighbor wireless device's address and its willingness to retransmit. 2-hop Neighbor Set represents a set of wireless devices adjacent to a neighbor wireless device.

MPR Set is a set of wireless devices selected as MPRs. MPR (Multipoint Relay) refers to a relay wireless device which is selected so that a packet PKT can be sent to all wireless devices 1-7 of the mesh network 100 by the least number of communications.

MPR Selector Set refers to a set of wireless devices for a wireless device which have selected it as an MPR.

The process in which local link information is created is summarized as follows. At the initial stage, each wireless device (1-7) sends a Hello message containing its self address to neighbor wireless devices to notify them of its existence. All wireless devices 1-7 do so and each wireless device (1-7) comes to know the existence of surrounding wireless devices and their addresses. In this way, Link Sets and Neighbor Wireless Device Sets are determined.

The local link information thus created continues to be periodically sent by Hello messages. By repeating this process, whether each link is unidirectional or bidirectional and what wireless devices exist beyond neighbor wireless devices gradually becomes known. Each wireless device (1-7) stores local link information which is created gradually in this way.

In addition, Hello messages also carry information on MPRs to wireless devices 1-7 periodically. Each wireless device (1-7) selects, from among neighbor wireless devices, several wireless devices, as a set of MPRs, which it requests to retransmit packets PKT that it transmits. The information on the MPR set is sent to neighbor wireless devices by a Hello message, and a wireless device which has received such Hello messages holds information on an "MPR selector set," a set of wireless devices which have selected it as an MPR. Consequently, each wireless device (1-7) can immediately know for which wireless devices it should retransmit received packets PKT.

Once local link set information has been created in each wireless device (1-7) by transmission/receipt of Hello messages, a TC message for notification of the topology of the whole mesh network 100 is sent to wireless devices 1-7. This TC message is periodically sent by all wireless devices selected as MPRs. Since the TC message includes information on links between each wireless device and a MPR selector set, all wireless devices 1-7 of the mesh network 100 can know all MPR sets and all MPR selector sets and also the topology of the whole mesh network 100 based on the information on all MPR sets and all MPR selector sets.

Apart from Hello messages, wireless devices 1-7 frequently exchange TC messages using MPRs. Consequently each wireless device (1-7) can know the topology of the whole mesh network 100.

Figure 7:
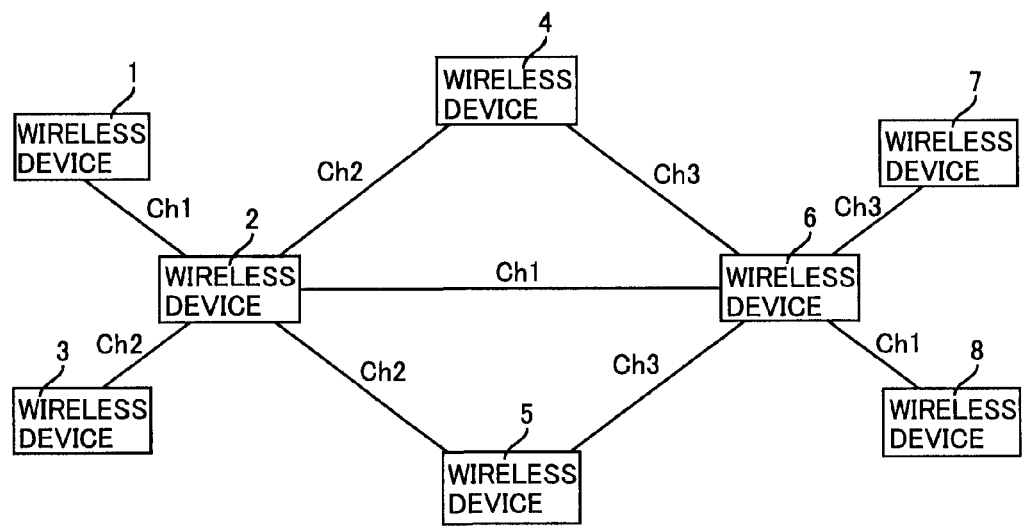
FIG. 7 shows an example of the mesh network.

FIG. 7 shows an example of the mesh network 100. Each wireless device (1-7) detects a channel for each link, based on channel information included in a Hello message which it has received from a neighbor wireless device with the following procedure.

In wireless device 2, if channel Ch1 and Ch2 are assigned to its interfaces IF1 and IF2 respectively, its communication means 201 generates a Hello message HMG1=[MACadd1-2:Ch1/MACadd2-2:Ch2] containing channel information MACadd1-2:Ch1 correlating channel Ch1 to the interface IF1's MAC address MACadd1-2 and channel information MACadd2-2:Ch2 correlating channel Ch2 to the interface IF2's MAC address MACadd2-2. The communication means 201 of wireless device 2 broadcasts the generated Hello message HMG1=[MACadd1-2:Ch1/MACadd2-2:Ch2] using the interfaces IF1 and IF2. MAC addresses MACadd1-2 and MACadd2-2 are addresses which can be identified as MAC addresses of wireless device 2.

Wireless devices 1 and 3-6, located in an area where a packet can be received from wireless device 2, can receive the Hello message broadcast from wireless device 2, HMG1=[MACadd1-2:Ch1/MACadd2-2:Ch2], if either channel Ch1 or Ch2 is assigned to at least one of their interfaces IF1 and IF2.

For example, if channel 1 is assigned to the interface IF1 of wireless device 1, the interface IF1 of wireless device 1 receives a Hello message HMG1=[MACadd1-2:Ch1/MACadd2-2:Ch2] and transfers the received Hello message HMG1=[MACadd1-2:Ch1/MACadd2-2:Ch2] to the communication means 201 and tabulation means 241. The tabulation means 241 of wireless device 1 receives the Hello message HMG1=[MACadd1-2:Ch1/MACadd2-2:Ch2] from the interface IF1 and detects successful receipt of the Hello message HMG1 through the interface IF1 to which channel 1 is assigned.

In addition, the tabulation means 241 of wireless device 1 detects receipt of the Hello message HMG1 from wireless device 2 by reference to the source address of the Hello message HMG1 (wireless device 2's IP address IPadd2). As a consequence, the tabulation means 241 of wireless device 1 detects establishment of a link between wireless devices 1 and 2 through channel Ch1.

Similarly, the tabulation means 241 of wireless devices 3-6 detect establishment of a link between wireless devices 2 and 3, between wireless devices 2 and 4, between wireless devices 2 and 5, and between wireless devices 2 and 6 through Ch2, Ch2, Ch2 and Ch1 respectively.

If channels other than channels Ch1 and Ch2 are assigned to the interfaces IF1 and IF2 of wireless devices 1 and 3-6, wireless devices 1 and 3-6 cannot receive the Hello message HMG1 broadcast from wireless device 2. Hence, in that case, wireless devices 1 and 3-6 do not establish a link with wireless device 1.

When the communication means 201 of wireless device 4 successfully receives the Hello message HMG1 from wireless device 2 through the interface IF1 which is assigned Ch2, it generates a Hello message HMG2=[MACadd2-2⇔MACadd1-4:Ch2/MACadd2-4:Ch3] containing channel information MACadd2-2⇔MACadd1-4:Ch2/MACadd2-4:Ch3 which indicates that CH2 and CH3 are respectively assigned to interfaces IF1 and IF2, and a link has been established between the interface IF1 of wireless device 4 and the interface IF2 of wireless device 2 through channel Ch2. The communication means 201 of wireless device 4 broadcasts the generated Hello message HMG2=[MACadd2-2⇔MACadd1-4:Ch2/MACadd2-4:Ch 3] using the interfaces IF1 and IF2.

Then, wireless device 6 successfully receives the Hello message HMG2=[MACadd2-2⇔MACadd1-4:Ch2/MACadd2-4:Ch3] through its interface IF2 to which channel Ch3 is assigned, and based on the Hello message HGM2, the tabulation means 241 of wireless device 6 detects establishment of a link between wireless devices 4 and 6 through channel Ch3 and also detects establishment of a link between wireless devices 2 and 4 through channel Ch2.

Similarly wireless device 6 receives a Hello message from wireless device 5 and detects establishment of a link between wireless devices 5 and 6 through channel Ch3 and also detects establishment of a link between wireless devices 2 and 5 through channel 2.

Wireless device 6 successfully receives the Hello message HMG1=[MACadd1-2:Ch1/MACadd2-2:Ch2] through its interface IF1 to which channel Ch1 is assigned and the tabulation means 241 of wireless device 6 detects establishment of a link between wireless devices 2 and 6 through channel Ch1.

Then, when the communication means 201 of wireless device 6, successfully receives Hello messages from wireless devices 2, 4, and 5, it generates a Hello message HMG3=[MACadd1-2⇔MACadd1-6:Ch1/MACadd2-4, MACadd2-5⇔MACadd2-6:Ch3] containing channel information MACadd1-2⇔MACadd1-6:Ch1/MACadd2-4, MACadd2-5⇔MACadd2-6:Ch3 which indicates that channels Ch1 and Ch3 are assigned to its interfaces IF1 and IF2 respectively, a link has been established between the interface IF1 of wireless device 6 and the interface IF1 of wireless device 2 through channel Ch1, and links have been established between the interface IF2 of wireless device 6 and the interface IF2 of each of wireless devices 4 and 5 through channel Ch3.

The communication means 201 of wireless device 6 broadcasts the generated Hello message HMG3=[MACadd1-2⇔MACadd1-6:Ch1/MACadd2-4, MACadd2-5⇔MACadd2-6:Ch3] using the interfaces IF1 and IF2.

Wireless device 7 successfully receives the Hello message HMG3=[MACadd1-2⇔MACadd1-6:Ch1/MACadd2-4, MACadd2-5⇔MACadd2-6:Ch3] through its interface IF2 to which channel Ch3 is assigned and the tabulation means 241 of wireless device 7 detects establishment of a link between wireless devices 6 and 7 through channel Ch3 and also detects establishment of a link between wireless devices 2 and 6 through channel Ch1 and establishment of a link between wireless devices 4 and 6 and between wireless devices 5 and 6 through channel Ch3.

Similarly the tabulation means 241 of wireless device 8 detects establishment of a link between wireless devices 6 and 8 through channel Ch1 and also detects establishment of a link between wireless devices 4 and 6 and between wireless devices 5 and 6 through channel Ch3.

In this way, each wireless device (1-8) broadcasts a Hello message containing information on the channels assigned to it and the Hello message also contains information on channels for links established between it and neighbor wireless devices.

Thus the tabulation means 241 of each wireless device (1-8) detects the channel distribution in a plurality of links within two hops from it.

Next, how each wireless device (1-8) evaluates links based on the channel distribution will be explained. In the explanation given below, a case that wireless device 2 evaluates the link between wireless devices 2 and 6 is taken as an example. FIG. 8 shows an example of a neighbor list. The tabulation means 241 of wireless device 2 receives Hello messages from wireless devices 1 and 3-6, wireless devices adjacent to it, and creates a neighbor list NTBL1 as shown in FIG. 8 based on the received Hello messages.

The tabulation means 241 of wireless device 2, based on the neighbor list NTBL1, detects the channel distribution shown in FIG. 7 as the channel distribution for links within two hops from wireless device 2.

There are several possible flows which forward a packet through the link to be evaluated (link between wireless devices 2 and 6), including a flow from wireless device 1 through wireless device 2 through wireless device 6 to wireless device 7, a flow from wireless device 1 through wireless device 2 through wireless device 6 to wireless device 8, and a flow from wireless device 3 through wireless device 2 through wireless device 6 to wireless device 7.

In these flows, intra-flow channel interference is channel interference between two links. For example, in a flow from wireless device 1 through wireless device 2 through wireless device 6 to wireless device 7, intra-flow channel interference is channel interference in any two links among the link between wireless devices 1 and 2, that between wireless devices 2 and 6, and that between wireless devices 6 and 7.

If the same channel is used by two links, channel interference will occur and if different channels are used between them, channel interference will not occur.

In other words, in two or more links which constitute a flow, if no channel interference occurs between two links, there is no intra-flow interference; on the other hand, if channel interference occurs between two links, there is intra-flow interference.

Regarding flows through the link to be evaluated (link between wireless devices 2 and 6), as shown in FIG. 7, channel distribution patterns, which indicate the presence/absence of intra-flow interference, are categorized into four standard distribution patterns.

Considering the deployment of wireless devices in an ordinary mesh network, it is only adjacent links that can cause interference with the link to be evaluated and thus in the explanation below, consideration is given only to adjacent links.

Figure 9:
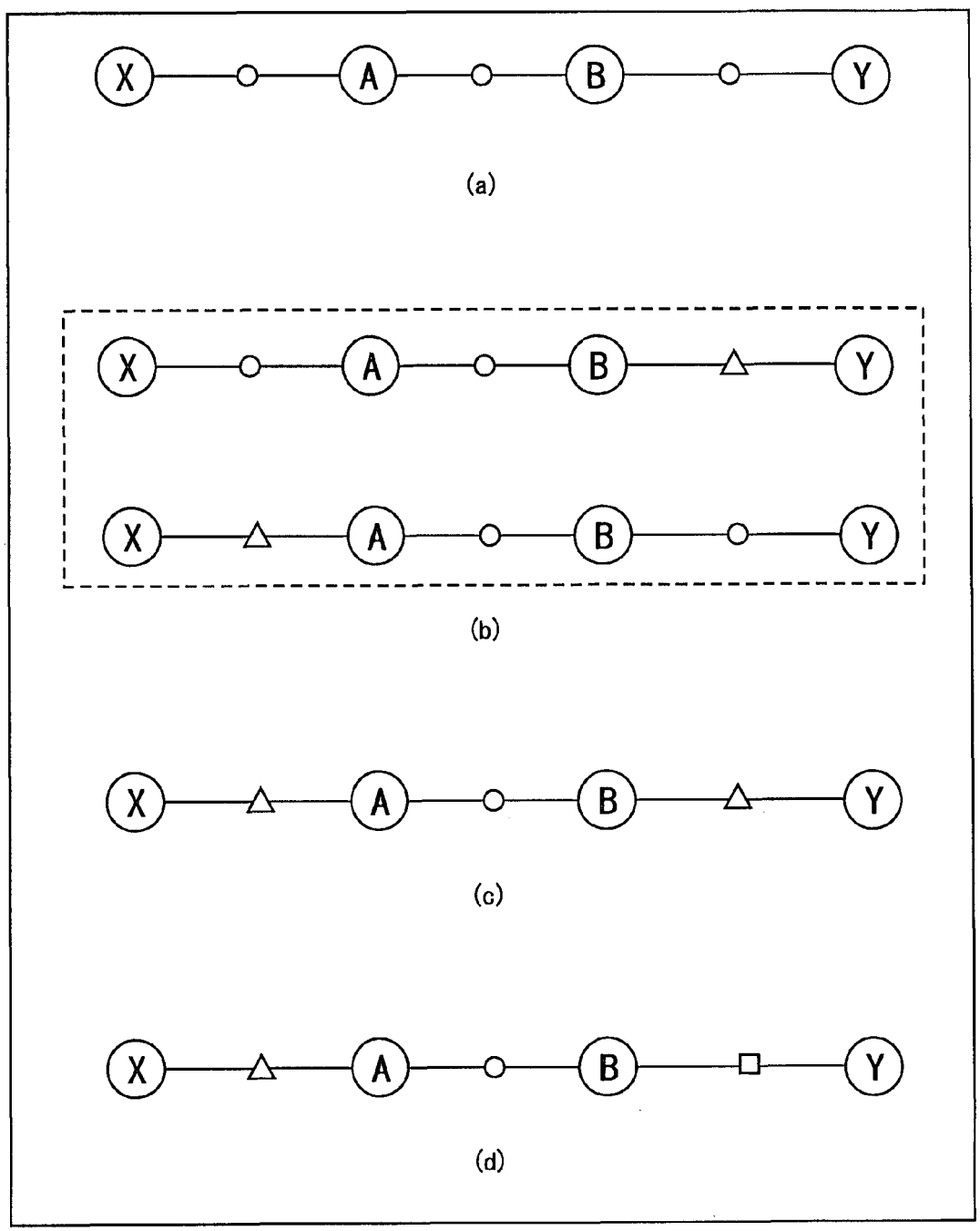
FIG. 9 is a conceptual diagram of standard channel distribution patterns indicating the presence/absence of intra-flow interference.

FIG. 9 is a conceptual diagram of standard channel distribution patterns indicating the presence/absence of intra-flow interference. In FIG. 9, the white circles, white triangles, and white squares represent channels. When a flow from wireless device X through wireless device A through wireless device B to wireless device Y is considered, channel distribution patterns for the three links which constitute the flow, Link 1 to Link 3 are categorized to one of four standard channel distribution patterns as represented by (a) to (d) in FIG. 9.

The standard distribution pattern represented by (a) in FIG. 9 is a pattern which uses the same channel for the three consecutive links, Link 1 to Link 3. The standard distribution pattern represented by (b) in FIG. 9 is a pattern in which one of the three links (Link 1 to Link 3) which is at the end uses a different channel from the channel used for the other two links.

The standard distribution pattern represented by (c) in FIG. 9 is a pattern which uses the same channel for the two of the three links (Link 1 to Link 3) which are at the ends, and uses a different channel for the center link from the channel for the links at the ends. The standard distribution pattern represented by (d) in FIG. 9 is a pattern which uses different channels for the three links (Link 1 to Link 3).

If a flow consists of three links, a channel distribution pattern for the three links should be one of the four standard distribution patterns shown in FIG. 9. Here, the standard distribution patterns shown as (a) to (d) in FIG. 9 are designated by DP_std1 to DP_std4 respectively.

The result of actual measurement of throughput between wireless devices X and Y when the channel distribution pattern for the three links is each one of the standard distribution patterns DP_std1 to DP_std4, is shown in Table 1.

TABLE 1

| Standard Distribution Pattern | Standard Distribution Pattern | Ratio of Throughput to Maximum Throughput |
| --- | --- | --- |
| DP_std4 | 17.3 Mbps | 1.0 |
| DP_std3 | 13.5 Mbps | 0.78 |
| DP_std2 | 11.3 Mbps | 0.65 |
| DP_std1 | 10.5 Mbps | 0.61 |

Table 1 also shows ratios of throughput to maximum throughput.

As can be understood from Table 1, the throughput between wireless devices X and Y is the highest for the standard distribution pattern DP_std4 in which the channels for the three links are different with each other and the throughput declines in the following order: standard distribution patterns DP_std3, DP_std2 and DP_std1.

In order to improve throughput of the mesh network 100, it is necessary for each wireless device (1-7) to select a route which maximizes the throughput and transmit or relay a packet along the route.

Therefore, when the tabulation means 241 of wireless device 2 obtains the channel distribution information shown in FIG. 7, it detects all flows which pass through the link to be evaluated (link between wireless devices 2 and 6) and categorizes the channel distribution patterns in the detected flows into four standard distribution patterns DP_std1 to DP_std4.

Then, the tabulation means 241 of wireless device 2 counts the number of distribution patterns ($P_1$ to $P_4$) categorized to each of the standard distribution patterns DP_std1 to DP_std4.

The tabulation means of wireless device 2 holds 0.61, 0.65, 0.78, and 1.0, ratios of throughput to maximum throughput shown in Table 1, as $C_{p1}$, $C_{p2}$, $C_{p3}$, and $C_{p4}$, respectively.

Then the tabulation means 241 of wireless device 2 calculates ratios to maximum throughput, $C_{PEX}$, with consideration to channel interference with the link to be evaluated (link between wireless devices 2 and 6) in accordance with the following equation:

[Equation 5]

$$C_{PEX} = C_{p1}\left(\frac{P_1}{P_{all}}\right) + C_{p2}\left(\frac{P_2}{P_{all}}\right) + C_{p3}\left(\frac{P_3}{P_{all}}\right) + C_{p4}\left(\frac{P_4}{P_{all}}\right) \quad (5)$$

In Equation (5), $P_{all}$ represents the total number of flows passing through the link to be evaluated (link between wireless devices 2 and 6).

Then the tabulation means 241 of wireless device 2 substitutes the ratio of throughput to maximum throughput, $C_{PEX}$, as calculated in accordance with Equation (5), into the equation below to calculate the cost of the link to be evaluated, $Cost_{new}$:

[Equation 6]

$$Cost_{new} = \frac{Cost}{C_{PEX}} \quad (6)$$

In Equation (6), "Cost" is, for example, the number of hops in the link to be evaluated (=1).

In Equation (5), ($P_1/P_{all}$), ($P_2/P_{all}$), ($P_3/P_{all}$), and ($P_4/P_{all}$) denote ratios of probability that the channel distribution patterns in the flows passing through the link to be evaluated are categorized to the standard distribution patterns DP_std1 to DP_std4 respectively, $C_{p1}$ to $C_{p4}$ represent actually measured ratios of throughput to maximum throughput when the channel distribution patterns are categorized to the standard distribution patterns DP_std1 to DP_std4, respectively. Therefore, calculation of $C_{PEX}$, the ratio of throughput to maximum throughput for wireless communication using the link to be evaluated, in accordance with Equation (5), is equivalent to calculation of $C_{PEX}$, the ratio of throughput to maximum throughput, by weighted averaging of $C_{p1}$ to $C_{p4}$ as actually measured ratios of throughput to maximum throughput for the standard distribution patterns DP_std1 to DP_std4, with weights that are the ratios of probability that the channel distribution patterns are categorized to the standard distribution patterns DP_std1 to DP_std4, ($P_1/P_{all}$), ($P_2/P_{all}$), ($P_3/P_{all}$), and ($P_4/P_{all}$).

How to calculate $Cost_{new}$ is concretely explained below. The tabulation means 241 of wireless device 2 detects a maximum of 14 flows which pass through the link to be evaluated (link between wireless devices 2 and 4) as given below:

(1) a flow from wireless device 1 through wireless device through wireless device 6 to wireless device 8

(2) a flow from wireless device 1 through wireless device through wireless device 6 to wireless device 4

(3) a flow from wireless device 1 through wireless device through wireless device 6 to wireless device 5

(4) a flow from wireless device 1 through wireless device through wireless device 6 to wireless device 7

(5) a flow from wireless device 3 through wireless device through wireless device 6 to wireless device 8

(6) a flow from wireless device 4 through wireless device 2 through wireless device 6 to wireless device 8

(7) a flow from wireless device 5 through wireless device through wireless device 6 to wireless device 8

(8) a flow from wireless device 3 through wireless device 2 through wireless device 6 to wireless device 4

(9) a flow from wireless device 3 through wireless device through wireless device 6 to wireless device 5

(10) a flow from wireless device 3 through wireless device through wireless device 6 to wireless device 7

(11) a flow from wireless device 4 through wireless device through wireless device 6 to wireless device 5

(12) a flow from wireless device 4 through wireless device through wireless device 6 to wireless device 7

(13) a flow from wireless device 5 through wireless device through wireless device 6 to wireless device 4

(14) a flow from wireless device 5 through wireless device 2 through wireless device 6 to wireless device 7

The tabulation means 241 of wireless device 2 excludes loop flows, namely a flow from wireless device 4 through wireless device 2 through wireless device 6 to wireless device 4 and a flow from wireless device 5 through wireless device 2 through wireless device 6 to wireless device 5, from flows passing through the link to be evaluated (link between wireless devices 2 and 6).

Then, when the tabulation means 241 of wireless device 2 detects flows passing through the link to be evaluated (link between wireless devices 2 and 6), it categorizes flow (1) among the flows listed above to the standard channel distribution pattern DP_std1, flows (2)-(7) to the standard channel distribution pattern DP_std2, and flows (8)-(14) to the standard channel distribution pattern DP_std4.

In this case, there is no channel distribution pattern categorized to the standard distribution pattern DP_std3.

Then, the tabulation means 241 of wireless device 2 counts the number of channel distribution patterns categorized to the standard channel distribution pattern DP_std1, $P_1$, as 1, the number of channel distribution patterns categorized to the standard channel distribution pattern DP_std2, $P_2$, as 6, the number of channel distribution patterns categorized to the standard channel distribution pattern DP_std3, $P_3$, as 0, and the number of channel distribution patterns categorized to the standard channel distribution pattern DP_std4, $P_4$, as 7. Also, the tabulation means 241 of wireless device 2 counts the total number of flows passing through the link to be evaluated (link between wireless devices 2 and 6), $P_{all}$, as 14.

Then, the tabulation means 241 of wireless device 2 substitutes $P_1=1$, $P_2=6$, $P_3=0$, $P_4=7$, $C_{p1}=0.61$, $C_{p2}=0.65$, $C_{p3}=0.78$, $C_{p4}=1.0$, $P_{all}=14$ into Equation (5) and calculates the ratio of throughput to maximum throughput, $C_{PEX}$, with consideration to channel interference with the link to be evaluated (link between wireless devices 2 and 6). This leads to $C_{PEX}=0.82$ as expressed by the following equation:

[Equation 7]

$$C_{PEX} = C_{p1}\left(\frac{P_1}{P_{all}}\right) + C_{p2}\left(\frac{P_2}{P_{all}}\right) + C_{p3}\left(\frac{P_3}{P_{all}}\right) + C_{p4}\left(\frac{P_4}{P_{all}}\right) \quad (7)$$

$$= 0.61 \times \left(\frac{1}{14}\right) + 0.65 \times \left(\frac{6}{14}\right) + 0.78 \times \left(\frac{0}{14}\right) + 1.0 \times \left(\frac{7}{14}\right)$$

$$= 0.82$$

Then, the tabulation means 241 of wireless device 2 substitutes $C_{PEX}=0.82$ into Equation (6) to calculate $Cost_{new}$ (Equation (8)).

[Equation 8]

$$Cost_{new} = \frac{Cost}{0.82} \quad (8)$$

The tabulation means 241 of wireless device 2 also calculates $Cost_{new}$ of the link between wireless devices 2 and 4, the link between wireless devices 2 and 5, and the link between wireless devices 4 and 6 with the above procedure.

Furthermore, the tabulation means 241 of wireless device 2 calculates $Cost_{new}$ of the link between wireless devices 1 and 2 and the link between wireless devices 3 and 2 with a procedure explained below.

Figure 10:
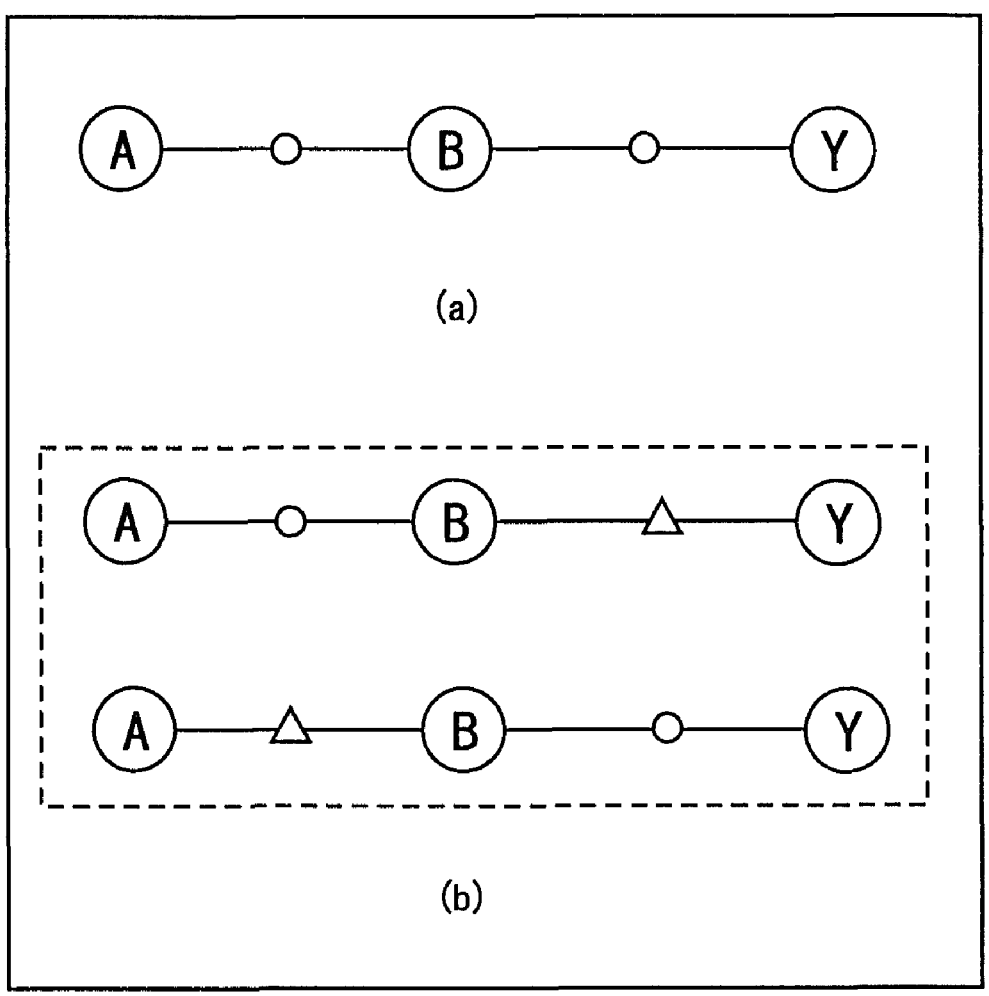
FIG. 10 is a conceptual diagram showing other standard channel distribution patterns indicating the presence/absence of intra-flow interference.

FIG. 10 is a conceptual diagram showing other standard channel distribution patterns indicating the presence/absence of intra-flow interference. In calculation of $Cost_{new}$ of the link between wireless devices 1 and 2 and the link between wireless devices 3 and 2, since there is a link only on one side of the link to be evaluated, channel distribution patterns involving intra-flow interference are categorized into two standard distribution patterns shown as (a) and (b) in FIG. 10.

Specifically, assuming that the link between wireless devices A and B is to be evaluated, the following two standard channel distribution patterns are possible: a standard distribution pattern which uses the same channel for the link between wireless devices A and B as for the link between wireless devices B and Y ((a) in FIG. 10) and a standard distribution pattern which uses a different channel for the link between wireless devices A and B from the channel used for the link between wireless devices B and Y ((b) in FIG. 10).

The results of actual measurements of throughput when the channel distribution patterns of the flows passing through the link to be evaluated are categorized to standard distribution patterns represented by (a) and (b) in FIG. 10, are shown in Table 2.

TABLE 2

| Standard<br>Distribution Pattern | Measured Throughput | Ratio of Throughput to<br>Maximum Throughput |
|---|---|---|
| DP_std6 | 19.4 Mbps | 1.0 |
| DP_std5 | 13.2 Mbps | 0.68 |

Here, the standard distribution patterns represented by (a) and (b) in FIG. 10 are designated by DP_std6 and DP_std5, respectively. As Table 2 indicates, when the channel distribution pattern in a flow passing through the link to be evaluated is categorized to the standard distribution pattern DP_std6, the ratio of throughput to maximum throughput, $C_{P6}$, is 1.0, and when the channel distribution pattern in a flow passing through the link to be evaluated is categorized to the standard distribution pattern DP_std5, the ratio of throughput to maximum throughput, $C_{P5}$, is 0.68.

The tabulation means 241 of wireless device 1 calculates the ratio of throughput to maximum throughput, $C_{PEX}$, with consideration to channel interference with the link to be evaluated (link between wireless devices 1 and 2) in accordance with the following equation where $P_5$ is the number of channel distribution patterns categorized to the standard distribution pattern DP_std5, $P_6$ is the number of channel distribution patterns categorized to the standard distribution pattern DP_std6, and $P_{all}$ is the total number of flows passing through the link to be evaluated:

[Equation 9]

$$C_{PEX} = C_{p5}\left(\frac{P_5}{P_{all}}\right) + C_{p6}\left(\frac{P_6}{P_{all}}\right) \quad (9)$$

After the tabulation means 241 of wireless device 1 calculates the ratio of throughput to maximum throughput, $C_{PEX}$, in accordance with Equation (9), it substitutes the calculated ratio $C_{PEX}$ into Equation (6) to calculate the cost of the link to be evaluated (link between wireless devices 1 and 2), $Cost_{new}$.

In Equation (9), ($P_5/P_{all}$) and ($P_6/P_{all}$) denote ratios of probability that the channel distribution patterns in the flows passing through the link to be evaluated are categorized to the standard distribution patterns DP_std5 and DP_std6 respectively, $C_{p5}$ and $C_{p6}$ represent actually measured ratios of throughput to maximum throughput when the channel distribution patterns are categorized to the standard distribution patterns DP_std5 and DP_std6, respectively. Therefore, calculation of $C_{PEX}$, the ratio of throughput to maximum throughput for wireless communication using the link to be evaluated, in accordance with Equation (9), is equivalent to calculation of $C_{PEX}$, the ratio of throughput to maximum throughput, by weighted-averaging of $C_{p5}$ and $C_{p6}$ as actually measured ratios of throughput to maximum throughput for the standard distribution patterns DP_std5 and DP_std6, with weights that are the ratios of probability that the channel distribution patterns are categorized to the standard distribution patterns DP_std5 and DP_std6, ($P_5/P_{all}$) and ($P_6/P_{all}$).

The tabulation means 241 of wireless device 1 calculates $Cost_{new}$ of the link between wireless devices 1 and 2 in accordance with Equations (9) and (6). More specifically, the tabulation means 241 of wireless device 1 calculates $C_{PEX}=0.68\times(1/4)+1\times(3/4)=0.92$ in accordance with Equation (9) and substitutes the result of calculation, $C_{PEX}=0.92$, into Equation (6) to calculate $Cost_{new}=1/0.91=1.09$.

Similarly, the tabulation means 241 of wireless device 2 calculates $Cost_{new}(=1.09)$ of the link between wireless devices 2 and 1 and $Cost_{new}(=1.09)$ of the link between wireless devices 2 and 3 in accordance with Equations (9) and (6); the tabulation means 241 of wireless device 3 calculates $Cost_{new}(=1.09)$ of the link between wireless devices 3 and 2 in accordance with Equations (9) and (6); the tabulation means 241 of wireless device 6 calculates $Cost_{new}(=1/0.84=1.19)$ of the link between wireless devices 6 and 7 and $Cost_{new}(=1/0.84=1.19)$ of the link between wireless devices 6 and 8 in accordance with Equations (9) and (6); the tabulation means 241 of wireless device 7 calculates $Cost_{new}(=1/0.84=1.19)$ of the link between wireless devices 7 and 6 in accordance with Equations (9) and (6); and the tabulation means 241 of wireless device 8 calculates $Cost_{new}(=1/0.84=1.19)$ of the link between wireless devices 8 and 6 in accordance with Equations (9) and (6).

Thus the tabulation means 241 of each of the wireless devices 1-3 and 6-8 calculates the $Cost_{new}$ of the link to be evaluated which only has one other link on one side, in accordance with Equations (9) and (6).

In the mesh network 100, a wireless device which is an MPR calculates $Cost_{new}$ of all the links between it and neighbor wireless devices and broadcasts a TC message including the calculated $Cost_{new}$. For example, if wireless device 2 is an MPR, the tabulation means 241 of wireless device 2 calculates $Cost_{new}$ of each of the links between it and wireless devices 1 and 3-6 using Equations (5) and (6) or (9) and (6) in accordance with the above procedures and broadcasts a TC message including the calculated $Cost_{new}$.

More specifically, the tabulation means 241 of wireless device 2 which is an MPR calculates $Cost_{new}$ 1 to $Cost_{new}$ 5 of all the links between it and wireless devices 1 and 3-6 using Equations (5) and (6) or (9) and (6) and generates a TC message=[IPadd1:$Cost_{new}$1/IPadd3:$Cost_{new}$2/IPadd4: $Cost_{new}$3/IPadd5: $Cost_{new}$4/IPadd6:$Cost_{new}$5] including the calculated $Cost_{new}$1 to $Cost_{new}$5. Then the tabulation means 241 of wireless device 2 broadcasts the TC message=[IPadd1: $Cost_{new}$1/IPadd3:$Cost_{new}$2/IPadd4:$Cost_{new}$3/IPadd5: $Cost_{new}$4/IPadd6:$Cost_{new}$5] through the communication means 201.

Consequently, the other wireless devices 1 and 3-8 can collect $Cost_{new}$1 to $Cost_{new}$5 of the links between wireless device 2 and wireless devices 1 and 3-6.

Figure 11:
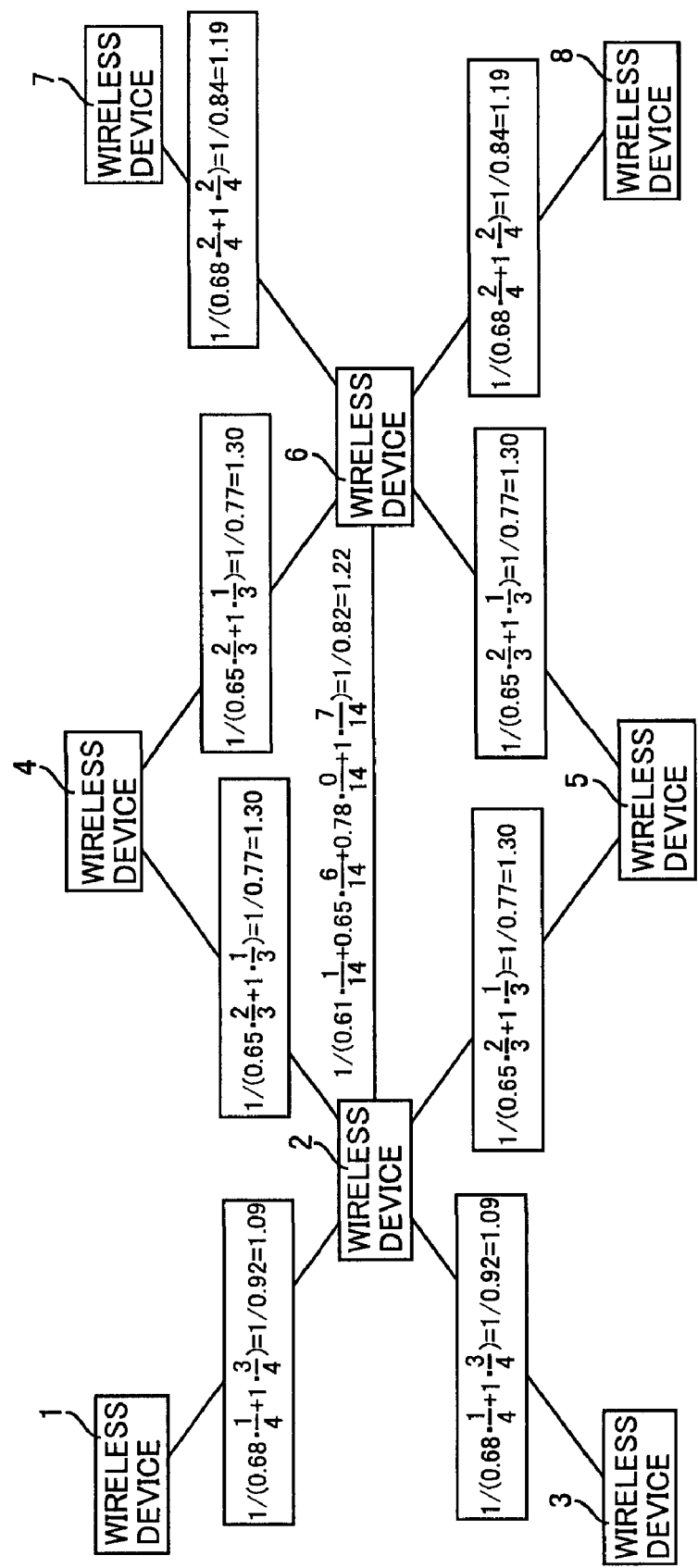
FIG. 11 shows the costs for the links in the channel distribution patterns shown in FIG. 7.

FIG. 11 shows the costs of the links in the channel distribution patterns shown in FIG. 7. Each wireless device (1-8) collects $Cost_{new}$ of the links in the channel distribution patterns shown in FIG. 7 by receiving a TC message from a wireless device which is an MPR. The link cost data $Cost_{new}$ collected by the wireless devices 1-8 are as shown in FIG. 11.

FIG. 12 shows an example of the routing table 21. The tabulation means 241 of wireless device 1 collects the $Cost_{new}$ data of the links shown in FIG. 11 from a TC message received from a wireless device which is an MPR and creates a routing table 21A as shown in FIG. 12 using the collected $Cost_{new}$ data.

If wireless device 2 is a destination, the tabulation means 241 of wireless device 1 stores the IP address of wireless device 2, IPadd2, in the Destination column and "Next Wireless Device" column and stores the cost of the link between wireless devices 1 and 2, $Cost_{new}$=1.09, in the Metric column to enter route information in the first line of the routing table 21A.

If wireless device 3 is a destination, the tabulation means 241 of wireless device 1 stores the IP address of wireless device 3, IPadd3, in the Destination column and the IP address of wireless device 2, IPadd2, in the Next Wireless Device column and calculates the sum of $Cost_{new}$=1.09 and $Cost_{new}$=1.09 (=2.18) of the two links in the flow from wireless device 1 through wireless device 2 to wireless device 3 and stores 2.18 in the Metric column to enter route information in the second line of the routing table 21A.

Using a similar procedure, the tabulation means 241 of wireless device 1 enters route information in the third to seventh lines of the routing table 21A to complete the routing table 21A.

In this case, "Metric" in the routing table 21A represents the minimum sum among the sums of costs of links to the destination, $Cost_{new}$, where the route with the minimum sum of costs $Cost_{new}$ is found by the Dijkstra method.

FIG. 13 shows another example of the routing table 21A. The tabulation means 241 of wireless device 2 calculates the minimum sum among the sums of costs of links in flows to each destination, $Cost_{new}$, from the $Cost_{new}$ data of the links shown in FIG. 11, and stores the calculated minimum sum in the Metric column to create a routing table 21B as shown in FIG. 13.

The communication means 201 of wireless device 1 receives a TCP packet addressed to wireless device 7 from a higher level layer and stores the received TCP packet in the data field and generates an IP packet. The communication means 201 of wireless device 1 determines the route to forward the generated IP packet to wireless device 7 by reference to the routing table 21A. Specifically, by reference to the routing table 21A, the communication means 201 of wireless device 1 finds that the IP address of wireless device 7 in the "Destination" column corresponds to the IP address of wireless device 2 in the "Next Wireless Device" column and determines that the route to forward the IP packet should include wireless device 2. Then the communication means 201 of wireless device 1 forwards the IP packet to wireless device 2 through its interface IF1 (channel Ch1).

The interface IF1 (channel Ch1) of wireless device 2 receives the packet from wireless device 1 and transfers the packet to its communication means 201.

Then, the communication means 201 of wireless device 2 checks the header of the packet received from the interface IF1 and finds that the destination of the packet is wireless device 7. Then, by reference to the routing table 21B, the communication means 201 of wireless device 2 finds that the route to send the packet to wireless device 7 should include wireless device 6. Then the communication means 201 of wireless device 2 forwards the packet to wireless device 6 through its interface IF1 (channel Ch1).

Then, wireless device 6 receives the packet from wireless device 2 and checks only the destination of the packet and forwards the packet to wireless device 7 in the same manner as wireless device 2.

Wireless devices other than wireless devices 1, 2 and 6, namely wireless devices 3-5, 7 and 8, also forward a packet using a route determined so as to minimize the sum of reciprocals of ratios of throughput to maximum throughput, $C_{PEX}$, and check only the destination of a received packet and forward the packet to the destination in the same manner as wireless devices 1, 2, and 6.

As explained above, in the present invention, each wireless device (1-7) determines the route so as to minimize the sum of reciprocals of ratios of throughput to maximum throughput, $C_{PEX}$, and forwards a packet to a destination in a hop-by-hop manner using the determined route. In other words, each wireless device (1-7) determines the route so as to maximize the sum of ratios of throughput to maximum throughput, $C_{PEX}$, and forwards a packet to a destination in a hop-by-hop manner using the determined route.

Figure 14:
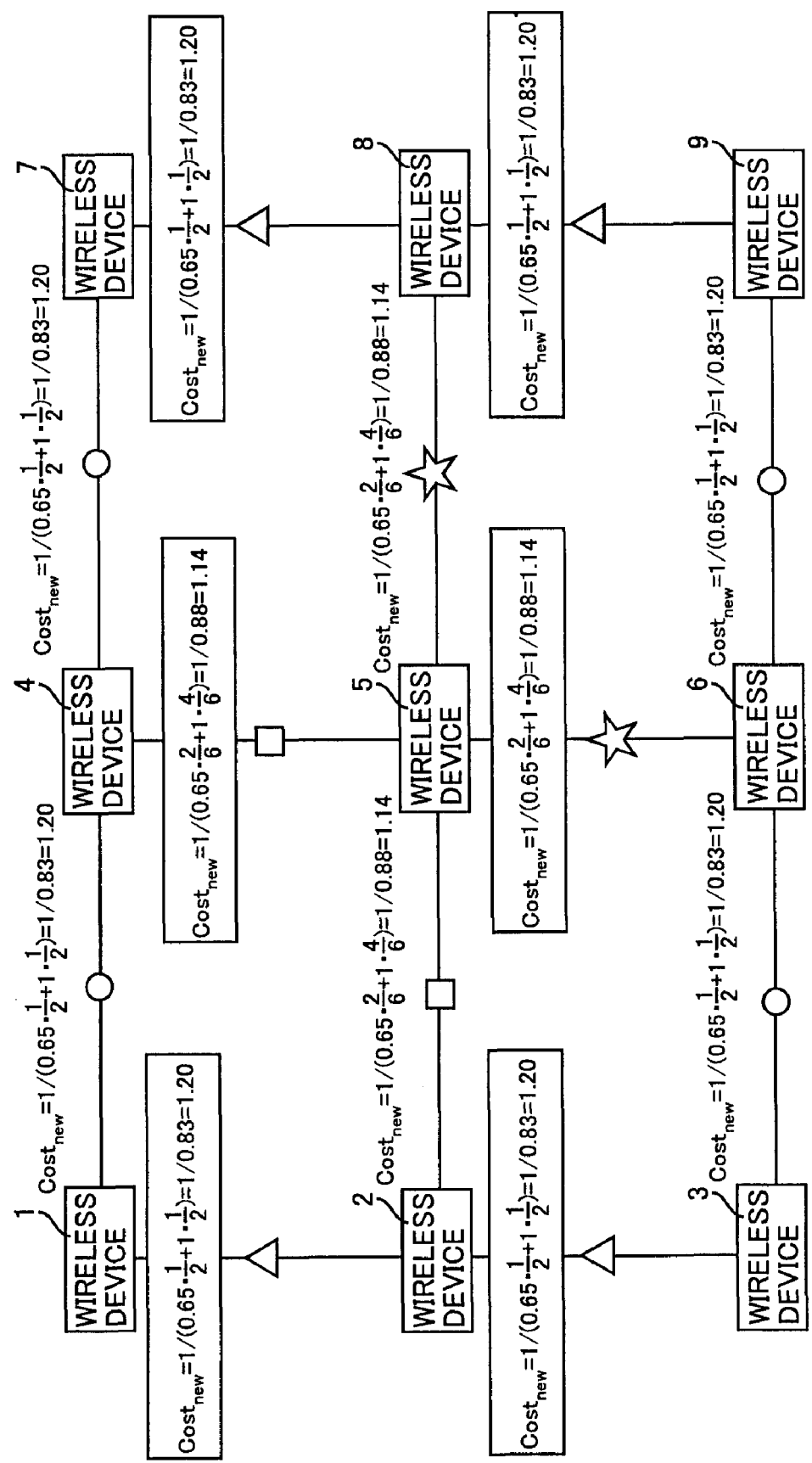
FIG. 14 shows another example of the costs for links.

FIG. 14 shows another example of the costs of links. In FIG. 14, the white circles, white triangles, white squares, and white pentagons represent channels. In the case of FIG. 14, the mesh network 100 is comprised of wireless devices 1-9 located in a grid pattern. Since each of the wireless devices 1-9 establishes a link between it and each of neighbor wireless devices on both sides of it, the channel distribution patterns for these links which involve channel interference are categorized into the standard distribution patterns DP_std1 to DP_std4 as shown in FIG. 9.

FIG. 14 shows the result of calculation of the cost of each link, $Cost_{new}$, where the channel distribution patterns are categorized into the standard distribution patterns DP_std1 to DP_std4.

FIGS. 15 and 16 are other further examples of the routing table 21. The tabulation means 241 of wireless device 1 collects the $Cost_{new}$ data of the links shown in FIG. 14 from a TC message and creates a routing table 21C as shown in FIG. 15.

If wireless device 2 is a destination, the tabulation means 241 of wireless device 1 stores the IP address of wireless device 2, IPadd2, in the Destination column and "Next Wireless Device" column and stores $Cost_{new}$=1.20 in the Metric column to enter route information in the first line of the routing table 21C.

If wireless device 5 is a destination, the tabulation means of wireless device 1 calculates the sum of costs $Cost_{new}$ of the route from wireless device 1 through wireless device 4 to wireless device 5, SM1, and the sum of costs $Cost_{new}$ of the route from wireless device 1 through wireless device 2 to wireless device 5, SM2. More specifically, the tabulation means 241 of wireless device 1 makes calculations as follows: SM1=1.20+1.14=2.34 and SM2=1.20+1.14=2.34. Thus the tabulation means 241 of wireless device 1 finds that the metric for the route from wireless device 1 through wireless device 4 to wireless device 5 (SM1, the sum of costs $Cost_{new}$) is equal to the metric for the route from wireless device 1 through wireless device 2 to wireless device 5 (SM2, the sum of costs $Cost_{new}$).

Then the tabulation means 241 of wireless device 1 stores the IP address of wireless device 5, IPadd5, in the Destination column and the IP addresses of wireless devices 2 and 4, IPadd2 and IPadd4, in the Next Wireless Device column and stores 2.34 in the Metric column to enter route information in the fourth line of the routing table 21C.

If wireless device 6 is a destination, the tabulation means 241 of wireless device 1 calculates the sum of costs $Cost_{new}$ of the route from wireless device 1 through wireless device 2 through wireless device 3 to wireless device 6, SM3, the sum of costs $Cost_{new}$ of the route from wireless device 1 through wireless device 2 through wireless device 5 to wireless device 6, SM4, and the sum of costs $Cost_{new}$ of the route from wireless device 1 through wireless device 4 through wireless device 5 to wireless device 6, SM5.

More specifically, the tabulation means 241 of wireless device 1 makes calculations as follows: SM3=1.20+1.20+1.20=3.60, SM4=1.20+1.14+1.14=3.48, and SM5=1.20+1.14+1.14=3.48. Thus the tabulation means 241 of wireless device 1 finds that the metric for the route from wireless device 1 through wireless device 2 through wireless device 5 to wireless device 6 (SM4, the sum of costs $Cost_{new}$) and the metric for the route from wireless device 1 through wireless device 4 through wireless device 5 to wireless device 6 (SM5, the sum of costs $Cost_{new}$) are equal to each other and smaller than the metric for the route from wireless device 1 through wireless device 2 through wireless device 3 to wireless device 6 (SM3, the sum of costs $Cost_{new}$).

Then the tabulation means 241 of wireless device 1 selects the route with the smallest metric which includes wireless device 2 or 4 and stores the IP address of wireless device 6, IPadd6, in the Destination column and the IP addresses of wireless devices 2 and 4, IPadd2 and IPadd4, in the Next Wireless Device column and stores 3.48 in the Metric column to enter route information in the fifth line of the routing table 21C.

If wireless device 9 is a destination, the tabulation means 241 of wireless device 1 calculates the sum of costs $Cost_{new}$ of the route from wireless device 1 through wireless device 2 through wireless device 3 through wireless device 6 to wireless device 9, SM6, the sum of costs $Cost_{new}$ of the route from wireless device 1 through wireless device 2 through wireless device 5 through wireless device 6 to wireless device 9, SM7, the sum of costs $Cost_{new}$ of the route from wireless device 1 through wireless device 2 through wireless device 5 through wireless device 8 to wireless device 9, SM8, the sum of costs $Cost_{new}$ of the route from wireless device 1 through wireless device 4 through wireless device 5 through wireless device 6 to wireless device 9, SM9, the sum of costs $Cost_{new}$ of the route from wireless device 1 through wireless device 4 through wireless device 5 through wireless device 8 to wireless device 9, SM10, and the sum of costs $Cost_{new}$ of the route from wireless device 1 through wireless device 4 through wireless device 7 through wireless device 8 to wireless device 9, SM11.

More specifically, the tabulation means 241 of wireless device 1 makes calculations as follows: SM6=1.20+1.20+1.20+1.20=4.80, SM7=1.20+1.14+1.14+1.20=4.68, SM8=1.20+1.14+1.14+1.20=4.68, SM9=1.20+1.14+1.14+1.20=4.68, SM10=1.20+1.14+1.14+1.20=4.68, and SM11=1.20+1.20+1.20+1.20=4.80. Thus the tabulation means 241 of wireless device 1 finds that the metric for the route from wireless device 1 through wireless device 2 through wireless device 5 through wireless device 6 to wireless device 9 (SM7, the sum of costs Cost$_{new}$), the metric for the route from wireless device 1 through wireless device 2 through wireless device 5 through wireless device 8 to wireless device 9 (SM8, the sum of costs Cost$_{new}$), the metric for the route from wireless device 1 through wireless device 4 through wireless device 5 through wireless device 6 to wireless device 9 (SM9, the sum of costs Cost$_{new}$), and the metric for the route from wireless device 1 through wireless device 4 through wireless device 5 through wireless device 8 to wireless device 9 (SM10, the sum of costs Cost$_{new}$) are equal to each other and smaller than the metric for the route from wireless device 1 through wireless device 2 through wireless device 3 through wireless device 6 to wireless device 9 (SM6, the sum of costs Cost$_{new}$) and the metric for the route from wireless device 1 through wireless device 4 through wireless device 7 through wireless device 8 to wireless device 9 (SM11, the sum of costs Cost$_{new}$).

Then the tabulation means 241 of wireless device 1 selects the route with the smallest metric which includes wireless devices 2 and 5, or 4 and 5 and stores the IP address of wireless device 9, IPadd9, in the Destination column and the IP addresses of wireless devices 2 and 4, IPadd2 and IPadd4, in the Next Wireless Device column and stores 4.68 in the Metric column to enter route information in the eighth line of the routing table 21C.

The tabulation means 241 of wireless device 1 enters route information in the second, third, sixth, and seventh lines of the routing table 21C with the above procedure to complete the routing table 21C.

The tabulation means 241 of wireless device 2 calculates the minimum sum among the sums of costs of links in flows to each destination, Cost$_{new}$, from the Cost$_{new}$ data of the links shown in FIG. 14, and stores the calculated minimum sum in the Metric column to create a routing table 21D as shown in FIG. 16.

The communication means 201 of wireless device 1 receives a TCP packet addressed to wireless device 9 from a higher level layer and stores the received TCP packet in the data field and generates an IP packet. The communication means 201 of wireless device 1 determines the route to forward the generated IP packet to wireless device 9 by reference to the routing table 21C. Specifically, by reference to the routing table 21C, the communication means 201 of wireless device 1 finds that the IP address of wireless device 9 in the "Destination" column corresponds to the IP address of wireless device 2 in the "Next Wireless Device" column and determines that the route to forward the IP packet should include wireless device 2. Then the communication means 201 of wireless device 1 forwards the IP packet to wireless device 2 through its interface IF1.

The interface IF1 of wireless device 2 receives the packet from wireless device 1 and transfers the packet to its communication means 201.

Then, the communication means 201 of wireless device 2 checks the header of the packet received from the interface IF1 and finds that the destination of the packet is wireless device 9. Then, by reference to the routing table 21D, the communication means 201 of wireless device 2 finds that the route to send the packet to wireless device 9 should include wireless device 5. Then the communication means 201 of wireless device 2 forwards the packet to wireless device 5 through its interface IF2.

Then, wireless device 5 receives the packet from wireless device 2 and checks only the destination of the packet and forwards the packet to wireless device 6 in the same manner as wireless device 2. Wireless device 6 receives the packet from wireless device 5 and checks only the destination of the packet and forwards the packet to wireless device 9 in the same manner as wireless device 5.

Wireless devices other than wireless devices 1, 2, 5, and 6, namely wireless devices 3, 4, and 7-9, forward a packet using a route determined so as to minimize the sum of reciprocals of ratios to maximum throughput, $C_{PEX}$ to forward the packet, and check only the destination of a received packet and forward the packet to the destination in the same manner as wireless devices 1, 2, 5, and 6.

As explained above, in the present invention, each wireless device (1-9) determines the route so as to minimize the sum of reciprocals of ratios of throughput to maximum throughput, $C_{PEX}$, and forwards a packet to a destination in a hop-by-hop manner using the determined route.

Figure 17:
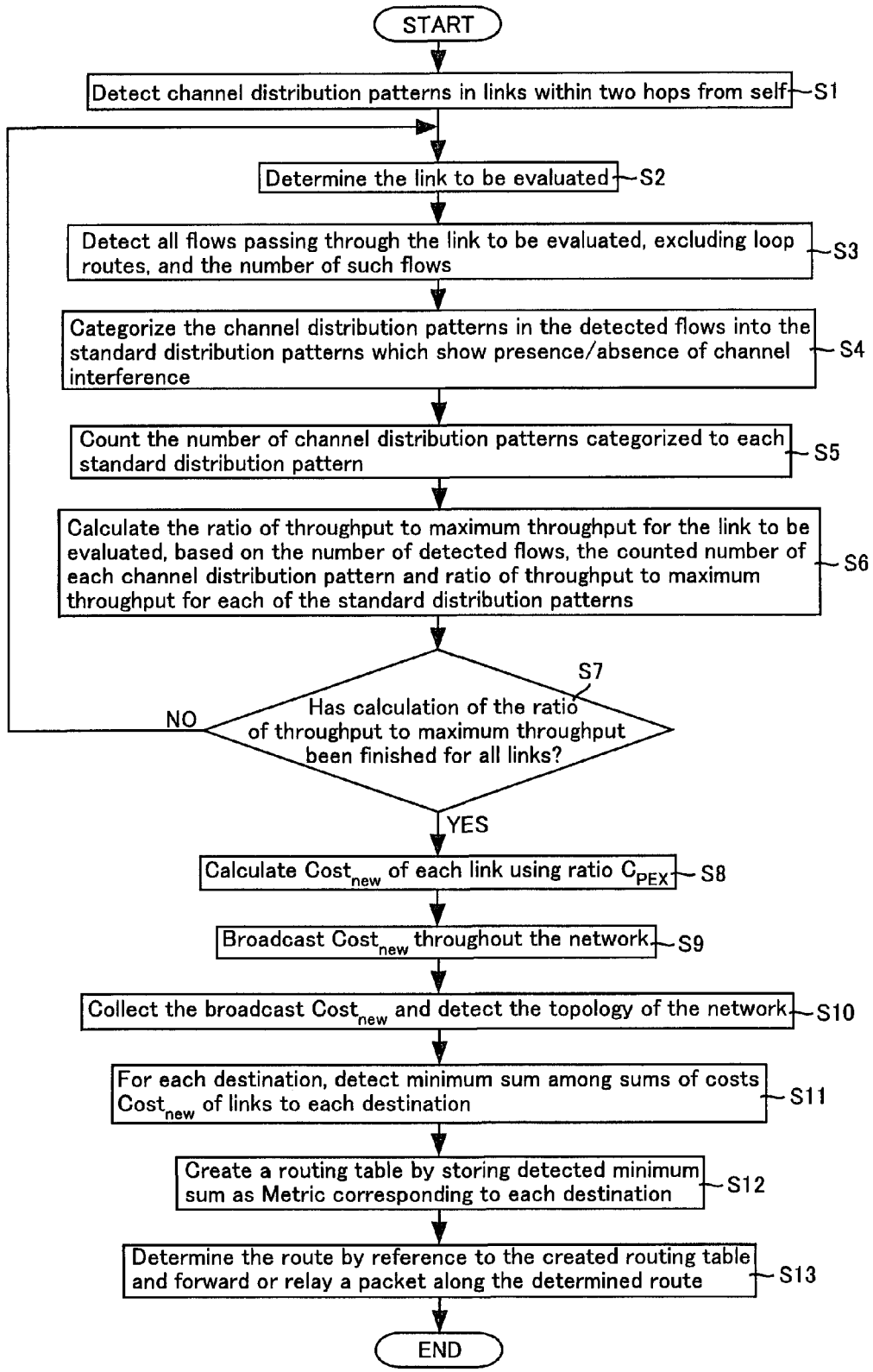
FIG. 17 is a flowchart illustrating the communication sequence in a mesh network according to the present invention.

FIG. 17 is a flowchart illustrating the communication sequence used in the mesh network according to the present invention.

When the sequence is started, each wireless device (1-7) receives a Hello message from a neighbor wireless device and detects the channel distribution patterns in links within two hops from it (Step S1).

Each wireless device (1-7) determines the link to be evaluated (Step S2) and detects all flows passing through the link to be evaluated and the number of such flows $P_{all}$, excluding loop routes (Step S3).

Each wireless device (1-7) categorizes the channel distribution patterns in the detected flows into standard distribution patterns indicating the presence/absence of channel interference, DP_std1 to DP_std4 (or DP_std5 and DP_std6) (Step S4) and counts the number of channel distribution patterns $P_1$ to $P_4$ (or $P_5$ and $P_6$) categorized to each of the standard distribution patterns DP_std1 to DP_std4 (or DP_std5 and DP_std6) (Step S5).

Each wireless device (1-7) calculates the ratio of throughput to maximum throughput for the link to be evaluated, $C_{PEX}$, from the number of detected flows, $P_{all}$, counted numbers of channel distribution patterns, $P_1$ to $P_4$ (or $P_5$ and $P_6$), and ratios of throughput to maximum throughput for the standard channel distribution patterns DP_std1 to DP_std4 (or DP_std5 and DP_std6), $C_{p1}$ to $C_{p4}$ (or $C_{p5}$ and $C_{p6}$) (Step S6).

Each wireless device (1-7) decides whether calculation of ratios of throughput to maximum throughput, $C_{PEX}$, has been finished for all links (Step S7). If it is decided at Step S7 that calculation of ratios of throughput to maximum throughput, $C_{PEX}$, has not been finished for all links, the sequence goes back to Step S2 and the above steps S2 to S7 are repeated until it is decided at Step S7 that calculation of ratios of throughput to maximum throughput, $C_{PEX}$, has been finished for all links.

If it is decided at Step S7 that calculation of the ratio of throughput to maximum throughput, $C_{PEX}$, has been finished for all links, then each wireless device (1-7) calculates the cost of each link Cost$_{new}$ from the ratios $C_{PEX}$ calculated at Step S6, with the above procedure (Step S8). After that, wireless devices which are MPR broadcast TC messages including the calculated costs Cost$_{new}$ throughout the network (Step S9).

Each wireless device (1-7) receives the TC message, collects the broadcast cost data Cost$_{new}$ and detects the topology of the whole network (Step S10).

Each wireless device (1-7) detects the minimum sum among the sums of costs Cost$_{new}$ of links to each destination (Step S11).

Then each wireless device (1-7) stores the detected minimum sum as the metric corresponding to each destination to create a routing table 21 (Step S12). Each wireless device (1-7) determines the route by reference to the routing table 21 and forwards or relays a packet along the determined route (Step S13). This concludes the sequence.

As explained above, in the present invention, each wireless device (1-7) detects all flows passing through the link to be evaluated, excluding loop routes, categorizes the channel distribution patterns in all the detected flows into standard distribution patterns indicating the presence/absence of channel interference, calculates the ratio of throughput to maximum throughput, $C_{PEX}$, for wireless communication using the link to be evaluated and selects a route according to the metric for each route which reflects the calculated $C_{PEX}$ (Steps 3 to 13).

In short, each wireless device (1-7) calculates ratios of throughput to maximum throughput as expected in case of wireless communication using the link to be evaluated, and selects a route including links with relatively large throughput ratios.

Therefore, according to the present invention, since a route is selected based on throughput ratios $C_{PEX}$ and costs $Cost_{new}$ calculated as mentioned above, routing is done with less computational effort according to an isotonic, easy-to-implement routing protocol.

It has bee explained above that each wireless device (1-7) calculates $Cost_{new}$ in accordance with Equation (6). However, the present invention is not limited thereto and each wireless device (1-7) may calculate $Cost_{new}$ according to the type of user application 14.

For example, if an application with a high data rate like FTP (File Transfer Protocol) is used, each wireless device (1-7) calculates $Cost_{new}$ in accordance with the equation below:

[Equation 10]

$$Cost_{new} = \frac{AirTimeCost}{C_{PEX}} \tag{10}$$

In Equation (10), AirTimeCost denotes time for which a packet is transmitted in a wireless communication space. It is calculated from packet size, transmission rate and packet error rate.

If the user application 14 has a relatively high data rate, each wireless device (1-7) calculates $Cost_{new}$ which is in inverse proportion to ratio of throughput to maximum throughput, $C_{PEX}$.

If the user application 14 is an application with a relatively low data rate like VoIP (Voice over Internet Protocol), each wireless device (1-7) calculates $Cost_{new}$ in accordance with the equation below:

[Equation 11]

$$Cost_{new} = AirTimeCost \tag{11}$$

In this case, each wireless device (1-7) calculates $Cost_{new}$ without using the ratio of throughput to maximum throughput $C_{PEX}$ described above.

If an application for transmission and receipt of video signals is used, each wireless device (1-7) calculates $Cost_{new}$ in accordance with the equation below:

[Equation 12]

$$Cost_{new} = \alpha \times AirTimeCost + (1-\alpha) \times \left(\frac{AirTimeCost}{C_{PEX}}\right) \tag{12}$$

In Equation (12), $\alpha$ is a real number which satisfies the relation $0 < \alpha < 1$. $\alpha$ depends on the extent of influence of interference which is estimated as compared to FTP. If the influence of interference is estimated to be half that for FTP, $\alpha$ is set at 0.5.

In the present invention, creation of a routing table 21 by the tabulation means 241 with the above procedure is equivalent to the approach to creating a routing table 21 in which, considering interference in a flow, a route with a relatively large ratio of throughput to maximum throughput in the flow is detected excluding loop routes, and the detected route is stored as the optimum route to the destination.

It has been explained above that each wireless device (1-9) has two interfaces assigned to different channels. However, the present invention is not limited thereto and each wireless device (1-9) may have three or more interfaces assigned to different channels. Generally speaking, it has a plurality of interfaces assigned to different channels.

Also it has been explained above that each wireless device (1-9) creates a routing table 21 using a proactive hop-by-hop routing protocol. However, the present invention is not limited thereto and each wireless device (1-9) may create a routing table 21 using any type of protocol as far as the protocol is a proactive hop-by-hop routing protocol.

It should be understood that the preferred embodiments disclosed herein are illustrative and not restrictive. The scope of the present invention is defined by the appended claims rather than by the above description of the preferred embodiments and all changes that fall within metes and bounds of the claims, or equivalence of such metes and bounds, are therefore intended to be embraced by the claims.

What is claimed is:

1. A wireless device which is used in a mesh network including a plurality of wireless devices located in a mesh pattern, and makes wireless communication using a plurality of channels, the device comprising:
   a routing table storing route information;
   a plurality of interfaces each of which transmits and receives a packet using one channel selected from among the plurality of channels;
   a tabulation unit creating the routing table by detecting a route with relatively large ratio of throughput to maximum throughput, considering channel interference in flows, and excluding loop routes, and storing the detected route as the optimum route to a destination; and
   a communication unit selecting the optimum route from the routing table and transmits a packet,
   wherein the tabulation unit stores, in the routing table, a route metric which is smaller when the ratio of throughput to maximum throughput is larger, and larger when the ratio of throughput to maximum throughput is smaller, and a destination corresponding to the route metric to indicate the optimum route.

2. The wireless device according to claim 1, wherein the tabulation unit calculates, based on channel distributions in all flows passing through a link to be evaluated, ratios of throughput to maximum throughput for wireless communication using the link to be evaluated, and calculates the route metrics from the calculated ratios of throughput to maximum throughput and stores the calculated metrics in the routing table in correspondence with the destinations.

3. The wireless device according to claim 2, wherein the tabulation unit detects, based on the channel distributions, all channel distribution patterns in the flows, and categorizes all the detected channel distribution patterns into a plurality of standard distribution patterns and counts the number of channel distribution patterns categorized to each standard distribution pattern, and based on this counted number, the total number of distribution patterns, and actually measured ratios of throughput to maximum throughput for each standard distribution pattern, calculates ratios of throughput to maximum throughput for wireless communication using the link to be evaluated.

4. The wireless device according to claim 3, wherein the tabulation unit calculates ratios of throughput to maximum throughput for wireless communication using the link to be evaluated, from the number of distribution patterns categorized to each standard distribution pattern, the number of all the distribution patterns, and actually measured ratios of throughput to maximum throughput for each standard distribution pattern, by weighted-averaging of actually measured ratios of throughput to maximum throughput for each standard distribution pattern, with weights that are the ratios of probability that the channel distribution patterns are categorized to standard distribution patterns.

5. The wireless device according to claim 2, wherein the tabulation unit calculates the route metrics which are in inverse proportion to the ratios of throughput to maximum throughput for wireless communication using the link to be evaluated.

6. The wireless device according to claim 2, wherein: the tabulation unit calculates the link costs of all the links between the wireless device and wireless devices adjacent to it from the calculated ratios of throughput to maximum throughput; and
    after the tabulation unit calculates the link costs of all the links, the communication unit broadcasts the calculated link costs.

7. The wireless device according to claim 6, wherein the tabulation unit receives link costs broadcast from other wireless devices and calculates the route metrics from the received link costs.

8. The wireless device according to claim 2, wherein the tabulation unit calculates the route metrics from the ratios of throughput to maximum throughput for wireless communication using the link to be evaluated, by a method which varies according to the type of application using wireless communication.

9. The wireless device according to claim 8, wherein if transmission rate in the wireless communication is relatively high, the tabulation unit calculates a route metric which is in inverse proportion to the ratio of the throughput to the maximum throughput for wireless communication using the link to be evaluated.

10. A mesh network including a plurality of wireless devices located in a mesh pattern which make wireless communication using a plurality of channels, each of the wireless devices comprising:
    a routing table storing route information;
    a plurality of interfaces each of which transmits and receives a packet using one channel selected from among the channels;
    a tabulation unit creating the routing table by detecting a route with relatively large ratio of throughput to maximum throughput, considering channel interference in flows and excluding loop routes, and storing the detected route as the optimum route to a destination; and
    a communication unit selecting the optimum route from the routing table and transmits a packet,
    wherein the tabulation unit stores, in the routing table, a route metric which is smaller when the ratio of throughput to maximum throughput is larger, and larger when the ratio of throughput to maximum throughput is smaller, and a destination corresponding to the route metric to indicate the optimum route.

* * * * *